US012789975B1

(12) United States Patent
Lam et al.

(10) Patent No.: US 12,789,975 B1
(45) Date of Patent: Nov. 10, 2026

(54) CO-CURABLE COMPOSITE MATERIAL CONTAINING UV/VISIBLE LIGHT-RESISTANT FILM LAYER CONTAINING EPOXY RESIN-BASED UNSUPPORTED FILM LAYER WITH DIFFERENTIAL CURE CHARACTERISTIC FOR AIRCRAFT COMPOSITE MATERIAL AND METHOD

(71) Applicant: The Boeing Company, Arlington, VA (US)

(72) Inventors: Benjamin Zhang Lam, Seattle, WA (US); Melinda Dae Miller, Snohomish, WA (US); Jason Alan Bolles, Kent, WA (US); Jessica Renee Stiene, Seattle, WA (US); Dorekia Kaia Martin, Ladson, SC (US); Seth Albert Yakel, Seattle, WA (US); Eric Gregory Winter, Freeland, WA (US); Gwen Marie Lanphere Gross, Redmond, WA (US); Janice Lee Karty, Saint Louis, MO (US); Patrice Kathryn Ackerman, Kent, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 19/266,466

(22) Filed: Jul. 11, 2025

(51) Int. Cl.
*B64C 3/20* (2006.01)
*B64D 45/02* (2006.01)
(Continued)

(52) U.S. Cl.
CPC ................ *B64C 3/20* (2013.01); *B64D 45/02* (2013.01); *C08J 5/24* (2013.01); *B29C 70/42* (2013.01);
(Continued)

(58) Field of Classification Search
CPC ... B64C 3/20; B64C 2001/0072; B64D 45/02; C08J 5/24; C08J 2363/00; C08J 5/242;
(Continued)

(56) References Cited

U.S. PATENT DOCUMENTS 7,070,850 B2 7/2006 Dietz et al.
7,323,248 B2 1/2008 Ramsey
(Continued)

FOREIGN PATENT DOCUMENTS

CN 1191926 C 3/2005
CN 106221533 A 12/2016
(Continued)

OTHER PUBLICATIONS

EP Search Report mailed Sep. 23, 2024 in re EP Application No. 24165716.2.
(Continued)

*Primary Examiner* — Rodney A Bonnette
(74) *Attorney, Agent, or Firm* — COATS & BENNETT, PLLC

(57) ABSTRACT

A co-curable UV/visible light-resistant composite material stack configured to maximize UV/visible light-resistance and prevent comingling of epoxy resins from different composite material layers is disclosed, with the co-curable composite material stack comprising a co-curable unsupported epoxy resin-based UV/visible light-resistant material layer film comprising a first cure characteristic, a co-curable epoxy resin-containing composite material substrate comprising a co-curable epoxy resin comprising an induced second cure characteristic, with a dry veil material layer interposed between the co-curable epoxy resin-containing composite material substrate and the unsupported epoxy resin-based UV/visible light-resistant material layer film.

22 Claims, 19 Drawing Sheets

(51) Int. Cl.
*C08J 5/24* (2006.01)
*B29C 70/42* (2006.01)
*B29K 63/00* (2006.01)
*B29L 31/30* (2006.01)
*B64C 1/00* (2006.01)

(52) U.S. Cl.
CPC .. *B29K 2063/00* (2013.01); *B29K 2995/0055* (2013.01); *B29L 2031/3085* (2013.01); *B64C 2001/0072* (2013.01); *C08J 2363/00* (2013.01)

(58) Field of Classification Search
CPC ... C08J 5/243; C08J 5/244; C08J 5/245; C08J 5/246; B29C 70/42; B29K 2063/00; B29K 2995/0055; B29L 2031/3085
See application file for complete search history.

(56) References Cited

U.S. PATENT DOCUMENTS

| | | | | |
|---|---|---|---|---|
| 8,158,245 | B2 | 4/2012 | Pratte et al. | |
| 8,178,606 | B2 | 5/2012 | Sang et al. | |
| 8,685,544 | B2 | 4/2014 | Larson-Smith et al. | |
| 8,947,847 | B2 | 2/2015 | Langone et al. | |
| 9,676,961 | B2 | 6/2017 | Sang et al. | |
| 9,802,714 | B2 | 10/2017 | Gerken et al. | |
| 9,912,137 | B2 | 3/2018 | Le et al. | |
| 10,525,667 | B2 | 1/2020 | Hebert et al. | |
| 10,906,211 | B2 | 2/2021 | Sang et al. | |
| 11,752,708 | B2 | 9/2023 | Ackerman et al. | |
| 2010/0151186 | A1 | 6/2010 | Hebert | |
| 2012/0145319 | A1 | 6/2012 | Schaaf et al. | |
| 2014/0141242 | A1 | 5/2014 | Phillips et al. | |
| 2017/0043529 | A1 | 2/2017 | Sanderson | |
| 2018/0346146 | A1 * | 12/2018 | Sang | B32B 9/047 |
| 2018/0370087 | A1 | 12/2018 | Braley et al. | |
| 2019/0210338 | A1 | 7/2019 | Childers et al. | |
| 2019/0233946 | A1 | 8/2019 | Bruton et al. | |
| 2020/0070998 | A1 * | 3/2020 | Ayyadurai | C09D 5/24 |
| 2020/0156330 | A1 * | 5/2020 | Ogale | B29C 66/43 |
| 2020/0165005 | A1 | 5/2020 | Christy et al. | |
| 2020/0316823 | A1 | 10/2020 | Sang et al. | |
| 2021/0008855 | A1 | 1/2021 | Sang et al. | |
| 2021/0016319 | A1 | 1/2021 | Brei et al. | |
| 2021/0016553 | A1 | 1/2021 | Brei et al. | |
| 2021/0031942 | A1 | 2/2021 | Brei et al. | |
| 2021/0060607 | A1 | 3/2021 | Brei et al. | |
| 2021/0122891 | A1 | 4/2021 | Zhu et al. | |
| 2021/0367416 | A1 | 11/2021 | Hebert | |
| 2023/0080641 | A1 | 3/2023 | Ackerman et al. | |
| 2023/0311427 | A1 | 10/2023 | Adjorlolo et al. | |
| 2023/0311470 | A1 | 10/2023 | Ackerman et al. | |
| 2023/0312076 | A1 | 10/2023 | Adjorlolo et al. | |
| 2023/0312124 | A1 | 10/2023 | Ackerman et al. | |
| 2023/0312125 | A1 | 10/2023 | Ackerman et al. | |
| 2023/0391063 | A1 | 12/2023 | Ackerman et al. | |
| 2024/0026164 | A1 * | 1/2024 | Miller | C09D 5/004 |
| 2024/0391189 | A1 | 11/2024 | Lam et al. | |

FOREIGN PATENT DOCUMENTS

| | | | |
|---|---|---|---|
| CN | 106366996 | A | 2/2017 |
| EP | 3397556 | A1 | 11/2018 |
| EP | 3036049 | B1 | 5/2019 |
| EP | 3766683 | A1 | 1/2021 |
| IN | 201911023774 | A | 12/2020 |
| JP | 2012240610 | A | 12/2012 |
| WO | 2021003047 | A1 | 1/2021 |
| WO | 2021037889 | A1 | 3/2021 |

OTHER PUBLICATIONS

Bedel, V., et al., "Innovative conductive polymer composite coating for aircrafts lightning strike protection", Journal of Applied Polymer Science, Nov. 15, 2019, pp. 1-13, vol. 137, issue No. 20.

Guo, Y., et al., "Implementation of fiberglass in carbon fiber composites as an isolation layer that enhances lightning strike protection", Composites Science and Technology, Feb. 23, 2019, pp. 117-124, vol. 174.

EP Search Report mailed Aug. 23, 2023 in re EP Application No. 22212766.4.

EP Search Report mailed Aug. 25, 2023 in re EP Application No. 22212768.0.

EP Search Report mailed Aug. 25, 2023 in re EP Application No. 22212773.0.

EP Search Report mailed Nov. 8, 2023 in re EP App No. 23186786.2.

Syensqo, "Technical Data Sheet—Surface Master-905", Retrieved from the internet: URL: https://www.syensqo.com/en/product/surface-master-905 [retrieved on Nov. 11, 2024], pp. 1-4, XP093425185.

Cytec Engineered Materials, "Technical Data Sheet—Cycom 934", Retrieved from the internet. LIPI : https://www.pccomposites.com/wp-content/uploads/2015/07/PCPGRHT-297PW_TDS.pdf [retrieved on Nov. 15, 1995], pp. 1-15, XP093425189.

EP Search Report malled Sep. 2, 2026 in re EP Application No. 26161621.3.

* cited by examiner

CO-CURABLE COMPOSITE MATERIAL CONTAINING UV/VISIBLE LIGHT-RESISTANT FILM LAYER CONTAINING EPOXY RESIN-BASED UNSUPPORTED FILM LAYER WITH DIFFERENTIAL CURE CHARACTERISTIC FOR AIRCRAFT COMPOSITE MATERIAL AND METHOD

TECHNOLOGICAL FIELD

The present disclosure relates, generally, to the field of composite materials, and composite materials used for manufacturing large structural components and assemblies. More specifically, the present disclosure relates to the field of co-curable and co-cured composite materials used for structural materials for large structural aircraft components and assemblies.

BACKGROUND

The use of composite materials in the manufacture of various structural component parts continues to increase. At least due to the strength-to-weight ratios, composite materials offer advantages as replacements for denser materials such as, for example, metals, metal alloys, etc., where the overall weight of a completed structure (or the weight of a component part of a completed structure) is an important consideration in the selection of materials used in the manufacture of such a completed structure, or in the manufacture of a component of a completed structure.

Coating layers typically applied to composite materials are not as durable as, or have the longevity of, the composite materials to which such coating layers are applied. Composite material assemblies may otherwise comprise external or internal layers that can include, for example, protective coatings or other coating layers. For example, when composite materials are used in the fabrication of vehicles including, for example, aircraft, exterior paint coatings, referred to as an aircraft "livery", may require alteration, rework, change of logo, design, color scheme, etc., over the useful life of the vehicle.

Such livery alteration, for example, may include the removal of one or more decorative coating layers applied onto a composite material, including, for example, one or more paint layers. However, the removal of one layer or layer type (paint, primer, adhesion promoting layer, adhesive layer, etc.) from materials stacked onto a composite material can require the removal of additional layers or layer types that then must be built back up, or otherwise reconstituted. In addition, livery alteration or other rework requiring paint removal via use of paint removal techniques can damage underlying layers, or even damage composite materials (e.g., if the composite materials are exposed to excessive mechanical paint removal techniques).

Further, composite components made from composite materials used in the manufacture of larger structures (e.g., aircraft, etc.) may encounter electromagnetic effects (EMEs) during operation, including, for example, and without limitation, lightning strikes, static electricity buildup, etc. When such a structure encounters an EME, the electric current delivered to the structure can travel through the structure and damage dielectric (e.g., insulating) material including, for example, composite substrate structural materials and insulative coatings on the composite substrate structural materials.

Unless explicitly identified as such, no statement herein is admitted as prior art merely by its inclusion in the Technological Field and/or Background section.

SUMMARY

According to present aspects, a co-curable UV/visible light-resistant composite material stack for an aircraft assembly is disclosed, comprising a co-curable unsupported epoxy resin-based UV/visible light-resistant material layer film comprising a first cure characteristic having a first cure characteristic value, with the first cure characteristic value comprising at least one of a first gel point temperature value, a first gel time value, and a first curing viscosity value, and a co-curable epoxy resin-containing composite material substrate, with the co-curable epoxy resin-containing composite material substrate comprising a co-curable epoxy resin comprising an induced second cure characteristic having a co-curable epoxy resin comprising an induced second cure characteristic value, with the induced second cure characteristic value comprising at least one of a second gel point temperature value, a second gel time value, and a second curing viscosity value. The co-curable UV/visible light-resistant composite material stack for an aircraft assembly further comprises a dry veil material layer comprising a dry veil material layer first side and a dry veil material layer second side, with the dry veil material layer positioned immediately adjacent to the co-curable unsupported epoxy resin-based UV/visible light-resistant material layer, with the dry veil material layer comprising dry veil material layer fibers, with the dry veil material fibers comprising at least one of metal fibers, glass fibers, carbon fibers, polymer fibers, natural-product fibers, coated metal fibers, metal-coated glass fibers, metal-coated carbon fibers, metal-coated fibers metal-coated polymer fibers, metal-coated natural-product fibers, and combinations thereof. The co-curable UV/visible light-resistant composite material stack for an aircraft assembly further comprises a lightning strike protection layer positioned adjacent at least one of the co-curable unsupported epoxy resin-based UV/visible light-resistant material layer film and the dry veil material layer second side, and wherein the first cure characteristic value and the induced second cure characteristic value establish a selected differential cure characteristic value between the first cure characteristic value and the induced second cure characteristic value.

In another present aspect, the dry veil material layer is interposed between the co-curable epoxy resin-containing composite material substrate and the co-curable unsupported epoxy resin-based UV/visible light-resistant material layer film.

In another present aspect, the co-curable UV/light-resistant composite material stack, further comprises a lightning strike protection layer positioned between the co-curable epoxy resin-containing composite material substrate and the dry veil material layer, with the lightning strike protection layer configured to be in immediate contact with the co-curable epoxy resin-containing composite material substrate.

In another present aspect, the co-curable UV/light-resistant composite material stack, further comprises a lightning strike protection layer positioned adjacent the co-curable unsupported epoxy resin-based UV/visible light-resistant material layer film.

In another present aspect, the lightning strike protection layer is a separate layer in the co-curable UV/light-resistant composite material stack.

In another present aspect, the dry veil material layer comprises at least one of metal fibers, metal-coated fibers, and combinations thereof, wherein said dry veil material layer disperses an electromagnetic effect from the co-curable UV/visible light-resistant composite material stack in a co-cured state.

In another present aspect, the co-curable unsupported epoxy resin-based UV/visible light-resistant material layer film comprising the first cure characteristic is 100% responsible for the UV/visible light-resistant properties in the co-curable UV/visible light-resistant composite material stack.

In another present aspect, the lightning strike protection layer comprises a UV/visible light-resistant material, with the co-curable unsupported epoxy resin-based UV/visible light-resistant material layer film in combination with the UV/visible light-resistant layer lightning strike protection layer are together 100% responsible for the UV/visible light-resistant properties in the co-curable UV/visible light-resistant composite material stack.

In another present aspect, the first gel point temperature value is less than the second gel point temperature value.

In another present aspect, the co-curable epoxy resin-containing composite material substrate comprises a material substrate epoxy resin, with the material substrate epoxy resin comprising the second gel point temperature value, with the second gel point temperature value greater than 150° C., with the material substrate epoxy resin further comprising the second curing viscosity value, with the second curing viscosity value greater than about 1000 Pa-s at the second gel point temperature value, and wherein the first gel point temperature value of said co-curable unsupported epoxy resin-based UV/visible light-resistant material layer film is less than 150° C.

In another present aspect, the co-curable unsupported epoxy resin-based UV/visible light-resistant material layer film further comprises a UV/visible light resistivity value of about 12,000 $KJ/m^2$ for full spectrum UV light at a UV wavelength ranging from about 300 nm to about 400 nm, and about 43,000 $KJ/m^2$ at a visible light wavelength ranging from about 400 to about 700 nm at an unsupported epoxy resin-based UV/visible light-resistant material layer film thickness ranging from about 0.0001 to about 0.010 inches.

In another present aspect, the lightning strike protection layer comprises an electrical conductivity ranging from 0.01 milliOhms per square to 0.5 milliOhms per square.

In another present aspect, the co-curable unsupported epoxy resin-based UV/visible light-resistant material layer film is a single layer film, wherein the single layer film completely covers at least one of the dry veil material layer first side and the dry veil material layer second side.

Another present aspect is directed to a co-cured UV/visible light-resistant composite material stack made from the present co-curable UV/visible light-resistant composite material stack wherein, during co-curing the dry veil material layer is infiltrated only with epoxy resin from the co-curable unsupported epoxy resin-based UV/visible light-resistant material layer film.

In another present aspect, after co-curing, the dry veil material layer does not comprise a detectable amount of epoxy-based resin from the co-curable epoxy resin-containing composite material substrate in a co-cured state.

In another present aspect, after co-curing, no detectable amount of epoxy resin from the co-curable unsupported epoxy resin-based UV/visible light-resistant material layer film is detected in the co-curable epoxy resin-containing composite material substrate in a co-cured state.

Another present aspect is directed to a co-cured aircraft structure comprising the present co-curable UV/visible light-resistant composite in a co-cured state, with the co-curable UV/visible light-resistant composite material stack co-cured to form a co-cured UV/visible light-resistant composite material stack in the co-cured state, with the co-cured aircraft structure comprising at least one of a horizontal stabilizer assembly and wing assembly, and with the co-curable UV/visible light-resistant composite material stack comprising a co-curable unsupported epoxy resin-based UV/visible light-resistant material layer film comprising a first cure characteristic having a first cure characteristic value, with the first cure characteristic value comprising at least one of a first gel point temperature value, a first gel time value, and a first curing viscosity value, and a co-curable epoxy resin-containing composite material substrate, with the co-curable epoxy resin-containing material substrate comprising a co-curable epoxy resin comprising an induced second cure characteristic having an induce second sure characteristic value, with the induced second cure characteristic value comprising at least one of a second gel point temperature value, a second gel time value, and a second curing viscosity value. The co-curable UV/visible light-resistant composite material stack for an aircraft assembly further comprises a dry veil material layer comprising a dry veil material layer first side and a dry veil material layer second side, with the dry veil material layer positioned immediately adjacent to the co-curable unsupported epoxy resin-based UV/visible light-resistant material layer, with the dry veil material layer comprising dry veil material layer fibers, with the dry veil material fibers comprising at least one of metal fibers, glass fibers, carbon fibers, polymer fibers, natural-product fibers, coated metal fibers, metal-coated glass fibers, metal-coated carbon fibers, metal-coated polymer fibers, metal-coated natural-product fibers, and combinations thereof, and wherein said first cure characteristic value and the induced second cure characteristic value establish a selected differential cure characteristic value between the first cure characteristic value and the induced second cure characteristic value. The co-cured UV/light-resistant composite material stack further comprises a lightning strike protection layer positioned adjacent the co-curable unsupported epoxy resin-based UV/visible light-resistant material layer film.

Another present aspect is directed to an aircraft comprising the present co-cured aircraft structure comprising the present co-curable UV/visible light-resistant composite material in a co-cured state, with co-curable UV/visible light-resistant composite material stack co-cured to form a co-cured UV/visible light-resistant composite material in the co-cured state, with the co-cured aircraft structure comprising at least one of a horizontal stabilizer assembly and wing assembly, and with the co-curable UV/visible light-resistant composite material stack comprising a co-curable unsupported epoxy resin-based UV/visible light-resistant material layer film comprising a first cure characteristic having a first cure characteristic value, with the first cure characteristic value comprising at least one of a first gel point temperature value, a first gel time value, and a first curing viscosity value, and a co-curable epoxy resin-containing composite material substrate, with the co-curable epoxy resin-containing composite material substrate comprising a co-curable epoxy resin comprising an induced second cure characteristic having an induced second cure characteristic value, with the induced second cure characteristic value comprising at least one of a second gel point temperature value, a second gel time value, and a second curing viscosity value. The co-curable UV/visible light-resistant composite material stack for an aircraft assembly further comprises a dry veil material layer comprising a dry veil material layer first side and a dry veil material layer second side, with the dry veil material layer positioned immediately adjacent to the co-curable unsupported epoxy resin-based UV/visible light-resistant material layer, with the dry veil material layer comprising dry veil material layer fibers, with the dry veil material fibers comprising at least one of metal fibers, glass fibers, carbon fibers, polymer fibers, natural-product fibers, coated metal fibers, metal-coated glass fibers, metal-coated carbon fibers, metal-coated polymer fibers, metal-coated natural-product fibers, and combinations thereof, and wherein said first cure characteristic value and the induced second cure characteristic value are each configured to establish a selected differential cure characteristic value between the first cure characteristic value and the induced second cure characteristic value. The co-cured UV/light-resistant composite material further comprises a lightning strike protection layer positioned adjacent the co-curable unsupported epoxy resin-based UV/visible light-resistant material layer film.

Another present aspect is directed to a method for preparing a co-curable UV/visible light-resistant composite material stack for an aircraft structure, with the method comprising forming the co-curable UV/visible light-resistant composite material stack for the aircraft structure, with the co-curable UV/visible light-resistant composite material stack comprising a co-curable unsupported epoxy resin-based UV/visible light-resistant material layer film comprising a first cure characteristic having a first cure characteristic value, with the first cure characteristic value comprising at least one of a first gel point temperature value, a first gel time value, and a first curing viscosity value. The co-curable UV/visible light-resistant composite material stack further comprises a co-curable epoxy resin-containing composite material substrate, with the co-curable epoxy resin-containing composite material substrate comprising a co-curable epoxy resin comprising an induced second cure characteristic having an induced second cure characteristic value, with the induced second cure characteristic value comprising at least one of a second gel point temperature value, a second gel time value, and a second curing viscosity value. The co-curable UV/visible light-resistant composite material stack further comprises a dry veil material layer comprising a dry veil material layer first side and a dry veil material layer second side, said dry veil material layer positioned immediately adjacent to the co-curable unsupported epoxy resin-based UV/visible light-resistant material layer film, with the dry veil material layer comprising dry veil material layer fibers, with the dry veil material fibers comprising at least one of metal fibers, glass fibers, carbon fibers, polymer fibers, natural-product fibers, coated metal fibers, metal-coated glass fibers, metal-coated carbon fibers, metal-coated polymer fibers, metal-coated natural-product fibers, and combinations thereof. The co-curable UV/visible light-resistant composite material stack further comprises a lightning strike protection layer positioned adjacent the co-curable unsupported epoxy resin-based UV/visible light-resistant material layer film. The method further comprises establishing intentionally a differential cure characteristic value between the first cure characteristic value and the induced second cure characteristic value, and wherein said first gel point temperature value is less than the second gel point temperature value.

Another present aspect is directed to a method for preparing a co-cured UV/visible light-resistant composite material for an aircraft structure, with the method comprising forming a co-curable composite material stack, with the co-curable composite material stack comprising a co-curable unsupported epoxy resin-based UV/visible light-resistant material layer film comprising a first cure characteristic having a first characteristic value, with the first cure characteristic value comprising at least one of a first gel point temperature value, a first gel time value, and a first curing viscosity value. The co-curable UV/visible light-resistant composite material stack further comprises a co-curable epoxy resin-containing composite material substrate, with the co-curable epoxy resin-containing composite material substrate comprising a co-curable epoxy resin comprising an induced second cure characteristic having induced second cure characteristic value, with the induced second cure characteristic value comprising at least one of a second gel point temperature value, a second gel time value, and a second curing viscosity value. The co-curable UV/visible light-resistant composite material stack further comprises a dry veil material layer comprising a dry veil material layer first side and a dry veil material layer second side, said dry veil material layer positioned immediately adjacent to the co-curable unsupported epoxy resin-based UV/visible light-resistant material layer film said dry veil material layer comprising dry veil material layer fibers, with the dry veil material comprising at least one of metal fibers, glass fibers, carbon fibers, polymer fibers, natural-product fibers, coated metal fibers, metal-coated glass fibers, metal-coated carbon fibers, metal-coated polymer fibers, metal-coated natural-product fibers, and combinations thereof. The co-curable UV/visible light-resistant composite material stack further comprises a lightning strike protection layer positioned adjacent the co-curable unsupported epoxy resin-based UV/visible light-resistant material layer film. The method further comprises establishing intentionally a differential cure characteristic between the first cure characteristic value and the induced second cure characteristic value during co-curing, co-curing the co-curable composite material stack in a selected curing regimen to form the co-cured UV/visible light-resistant composite material for the aircraft structure, with the co-cured UV/visible light-resistant composite material comprising a co-cured unsupported epoxy resin-based UV/visible light-resistant material layer and a co-cured epoxy resin-containing composite material substrate, impregnating exclusively during curing the dry veil material layer with an amount of epoxy resin from the co-curable unsupported epoxy resin-based UV/visible light-resistant material layer film into the dry veil material layer to form a co-cured epoxy resin-impregnated dry veil material layer in a co-cured state, and wherein epoxy resin from the co-curable epoxy resin-containing material substrate does not co-mingle in the dry veil material layer with epoxy resin from the co-curable unsupported epoxy resin-based UV/visible light-resistant material layer film.

In another present aspect, the method further comprises establishing a gel point differential between the first gel point temperature value of the co-curable unsupported epoxy resin-based UV/visible light-resistant material layer film and the second gel point temperature value of the co-curable epoxy resin-containing composite material substrate, with the second gel point temperature value greater that the first gel point value.

In another present aspect, the method further comprises fully encapsulating the dry veil material layer fibers with epoxy resin from the co-curable unsupported epoxy resin-based UV/visible light-resistant material layer film during curing to form a fully encapsulated dry veil material layer, and completely excluding the presence of epoxy resin derived from the co-curable epoxy resin-containing composite material substrate from the fully encapsulated dry veil material layer during the selected curing regimen.

In another present aspect, the method further comprises forming an epoxy resin-based UV/visible light-resistant material layer film epoxy resin/co-curable epoxy resin-containing material substrate epoxy resin interface at a location that is substantially coincident with a co-cured epoxy resin-impregnated dry veil material layer/co-cured epoxy resin-containing composite material substrate interface, and inhibiting completely a migration of epoxy resin from the co-curable epoxy resin-containing composite material substrate into the co-cured epoxy resin-impregnated dry veil material layer during curing.

Another present aspect is directed to an aircraft structure comprising a co-cured UV/visible light-resistant composite material made according to a presently disclosed method.

Another present aspect is directed to an aircraft structure comprising a co-cured UV/visible light-resistant composite material made according to a presently disclosed method.

Another present aspect is directed to an aircraft comprising a co-cured UV/visible light-resistant composite material made according to a presently disclosed method.

In another present aspect, the co-curable epoxy resin-containing material substrate comprises a material substrate epoxy resin, said material substrate epoxy resin comprising the second gel point temperature value, said second gel point temperature value greater than 150° C., said material substrate epoxy resin further comprising the second curing viscosity value, said second curing viscosity value greater than about 1000 Pa-s at the second gel point temperature value.

In another present aspect, the first gel point temperature value of the co-curable unsupported epoxy resin-based UV/visible light-resistant material layer film is less than 150° C.

In another present aspect, the first gel point temperature value is less than the second gel point temperature value.

In another present aspect, the co-curable unsupported epoxy resin-based UV/visible light-resistant material layer film is a co-curable unsupported epoxy resin-based UV/visible light-resistant material layer single layer film.

In another present aspect, the co-curable unsupported epoxy resin-based UV/visible light-resistant material layer single layer film is configured to completely cover the dry veil material layer.

In another present aspect, the co-curable epoxy resin-containing composite material substrate comprises a plurality of prepreg layers.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
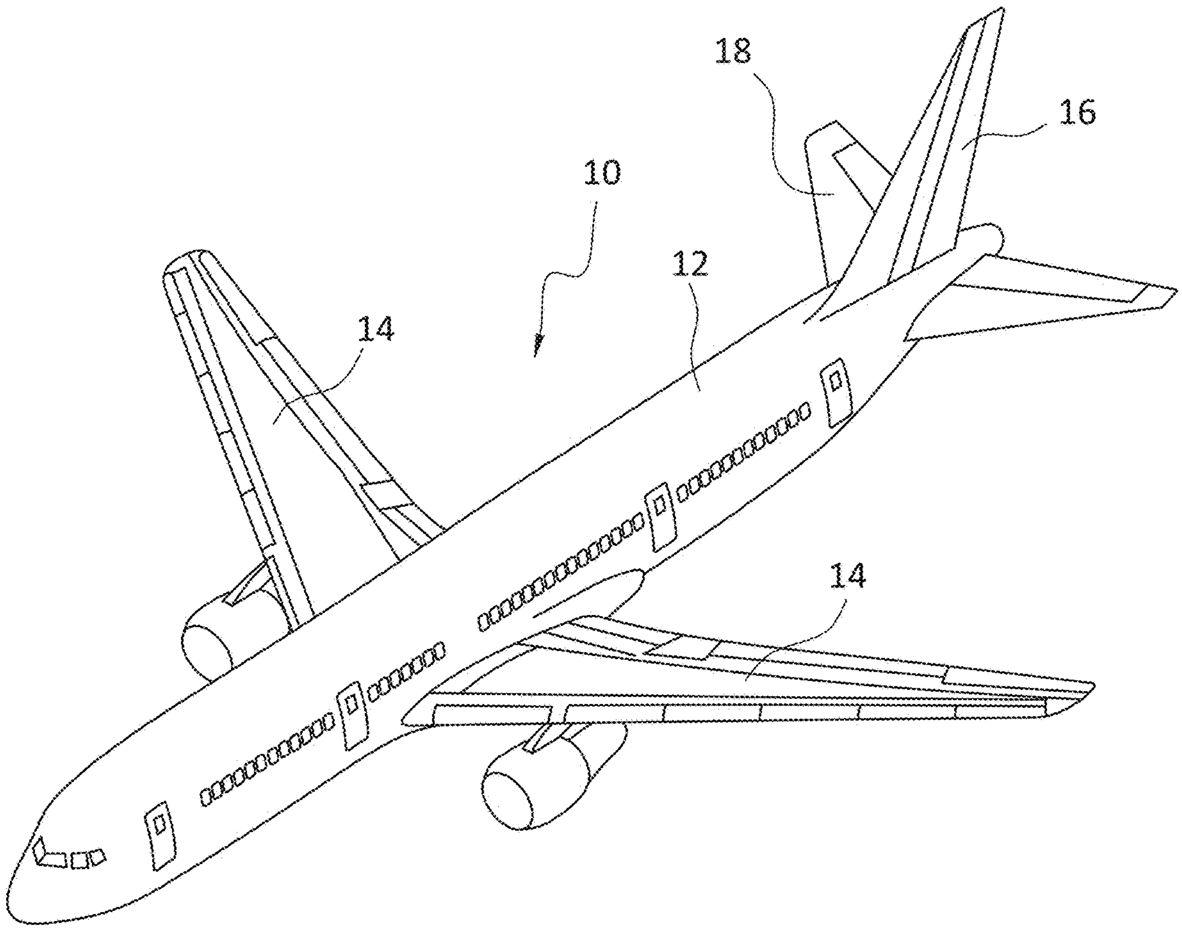
Figure 2C:
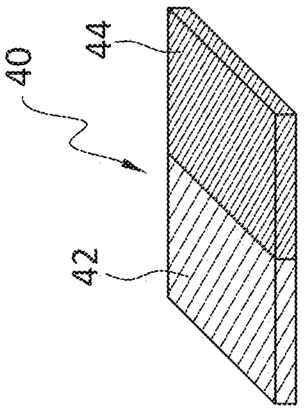
Figure 2B:
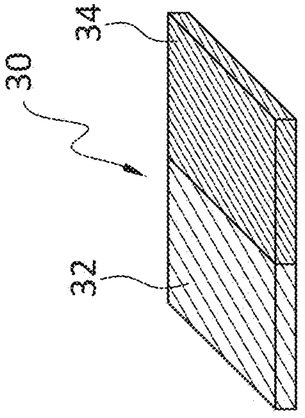
Figure 2A:
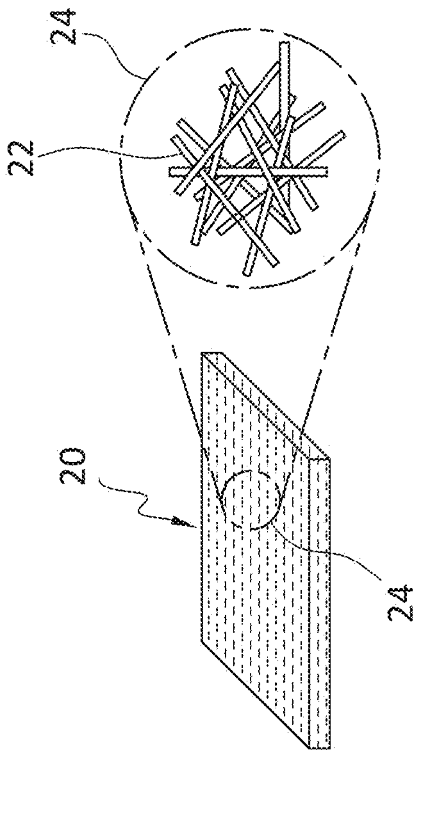
Figure 3:
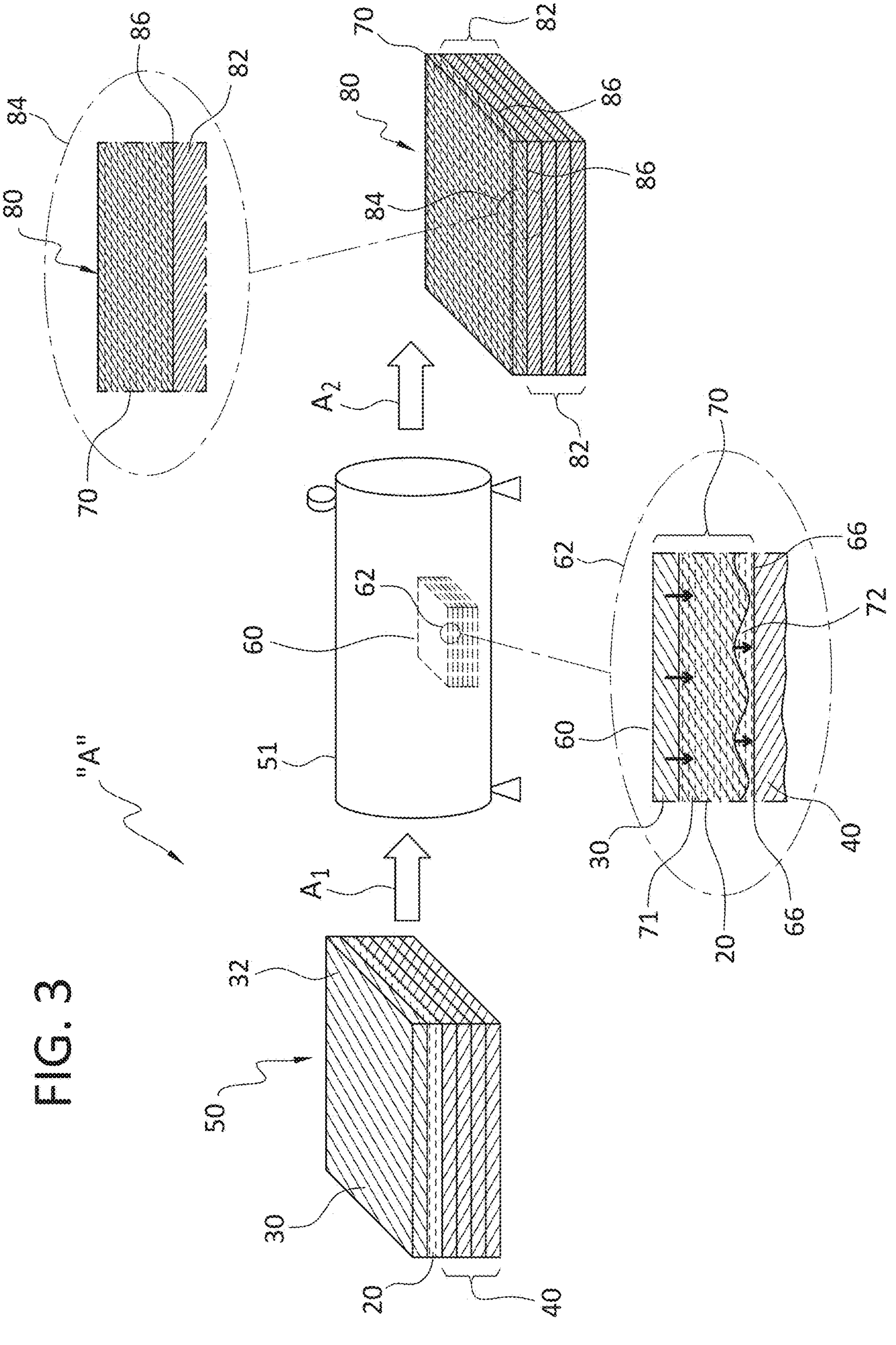
Figure 4:
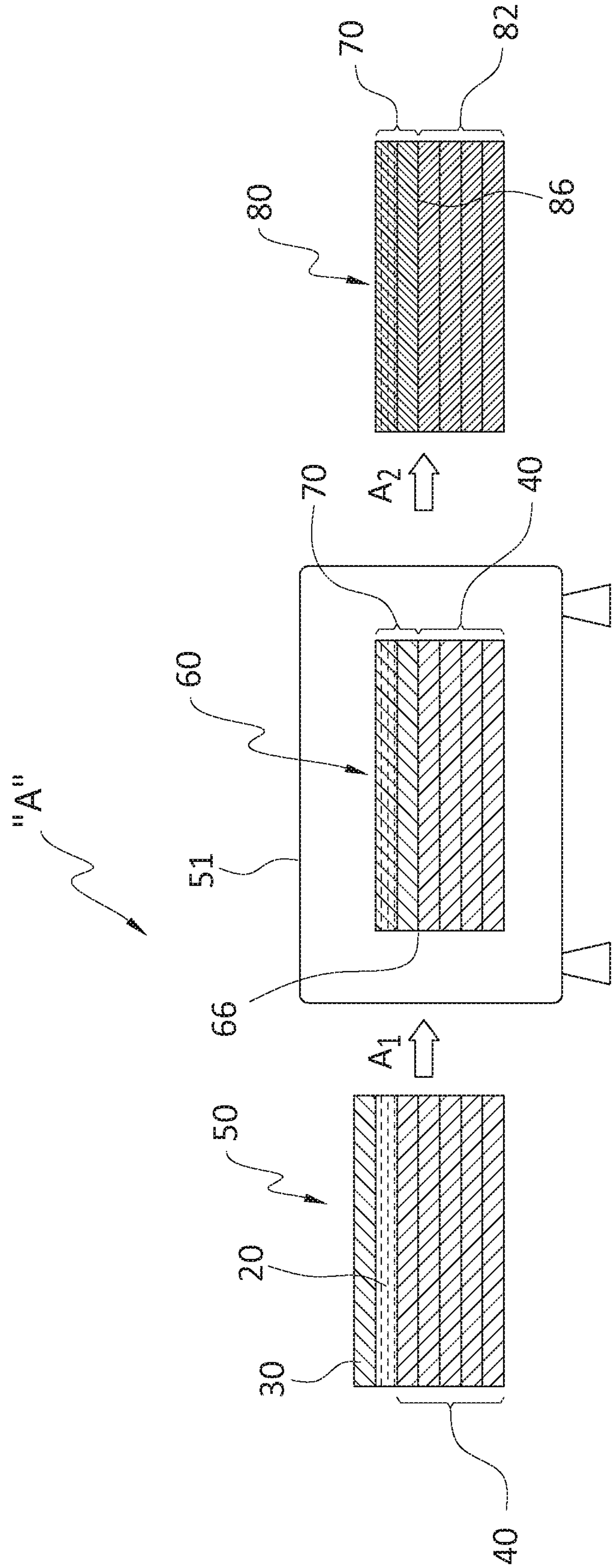
Figure 5:
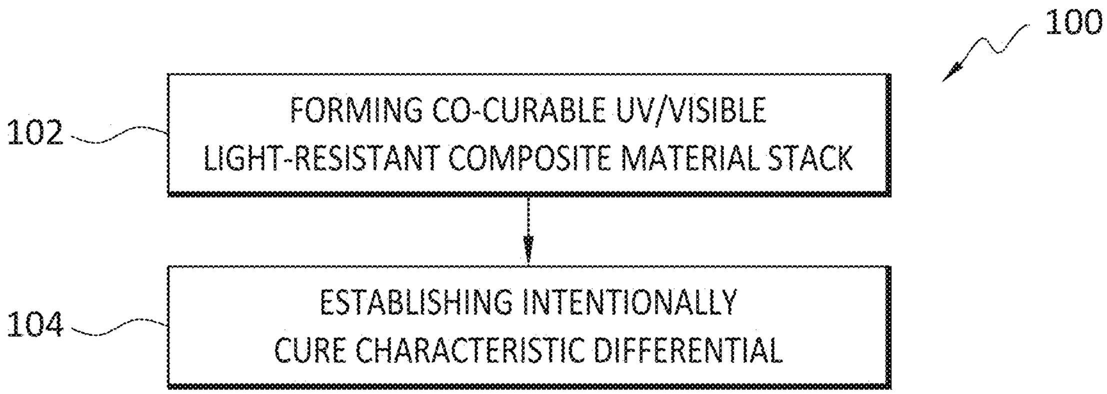
Figure 6:
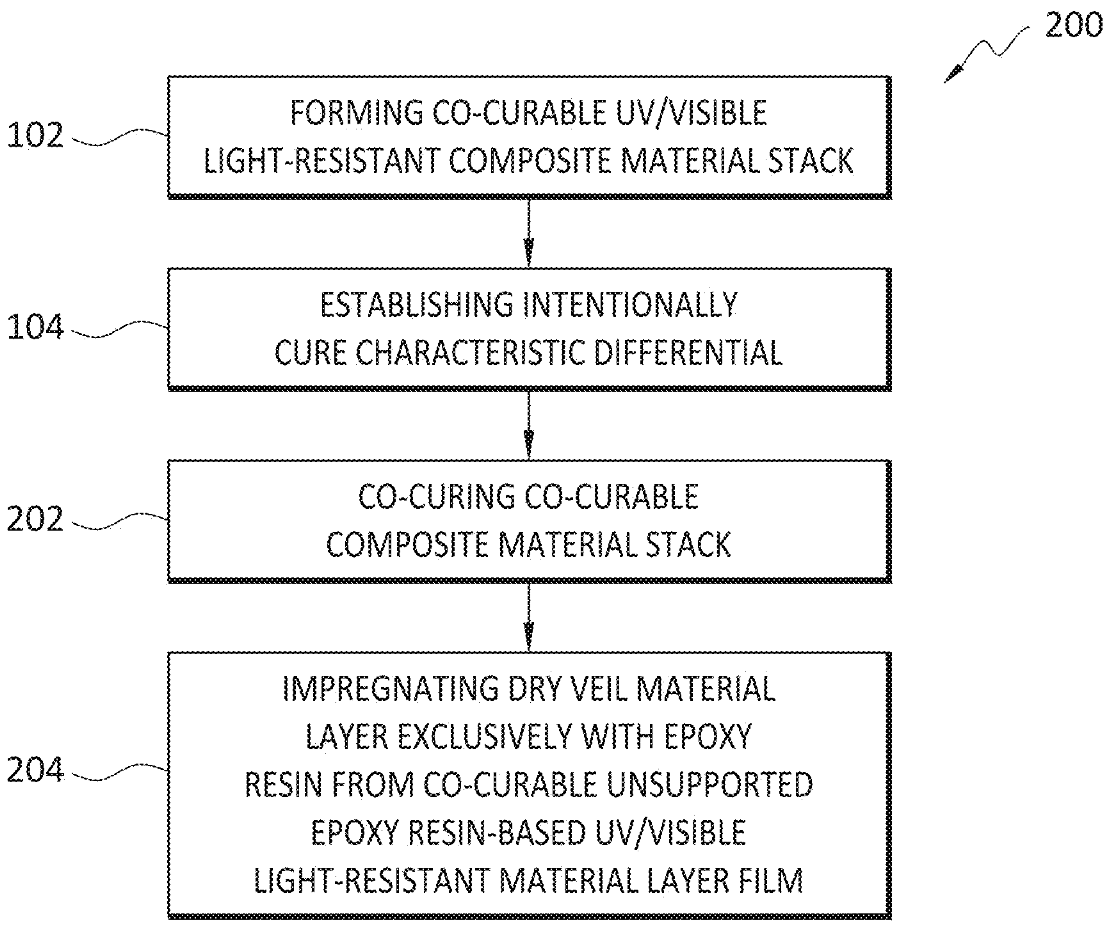
Figure 7:
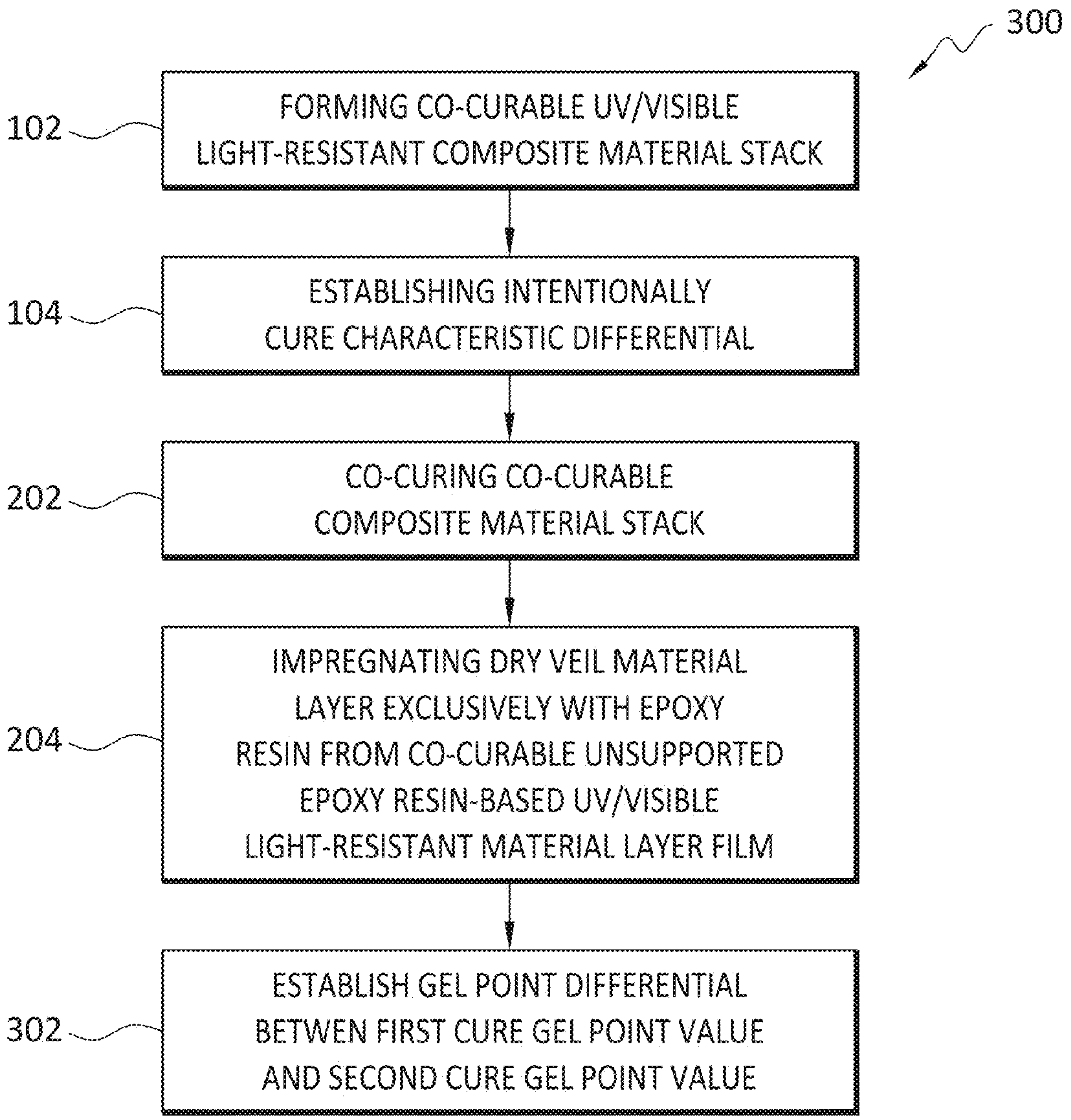
Figure 8:
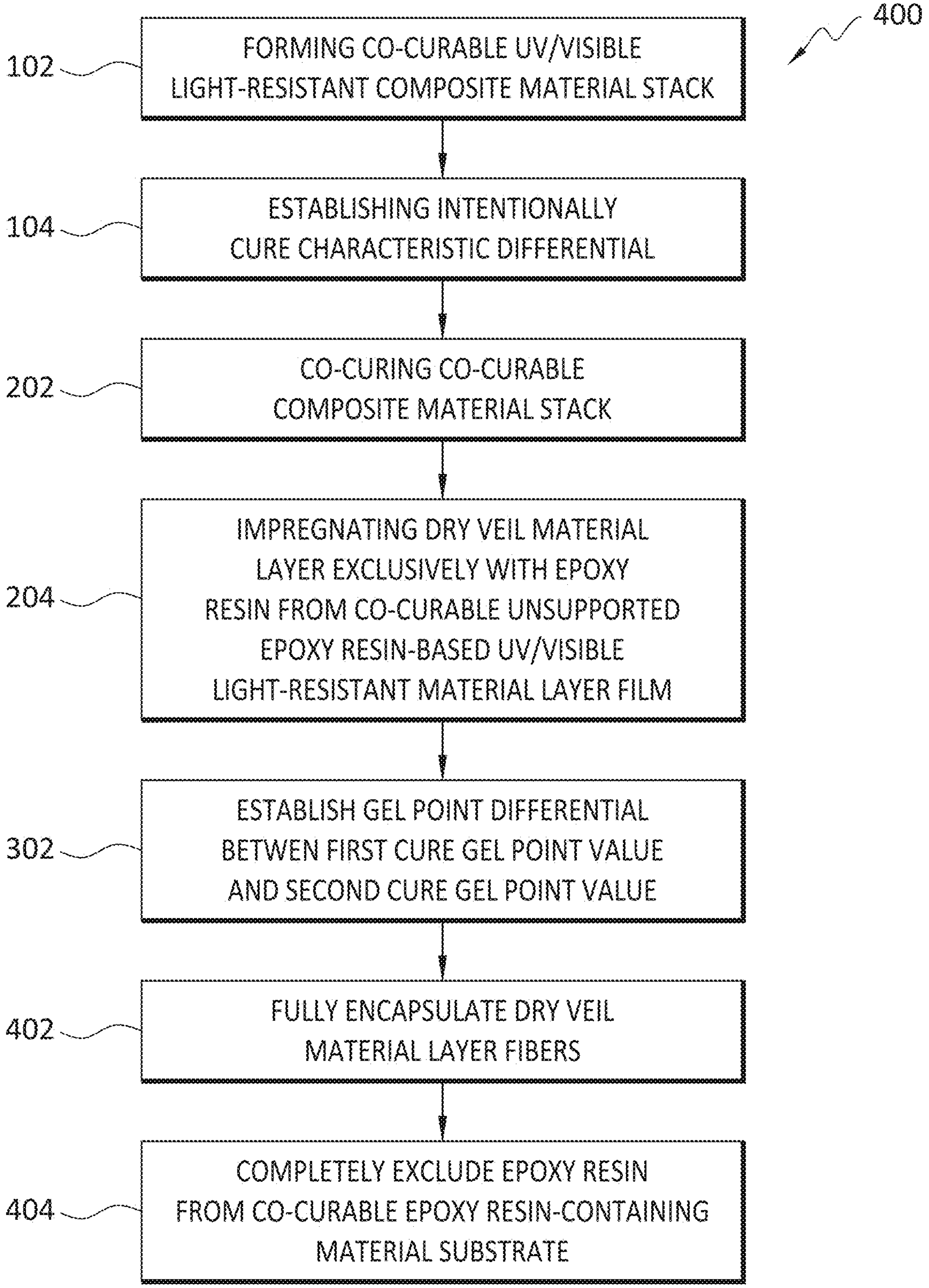
Figure 9:
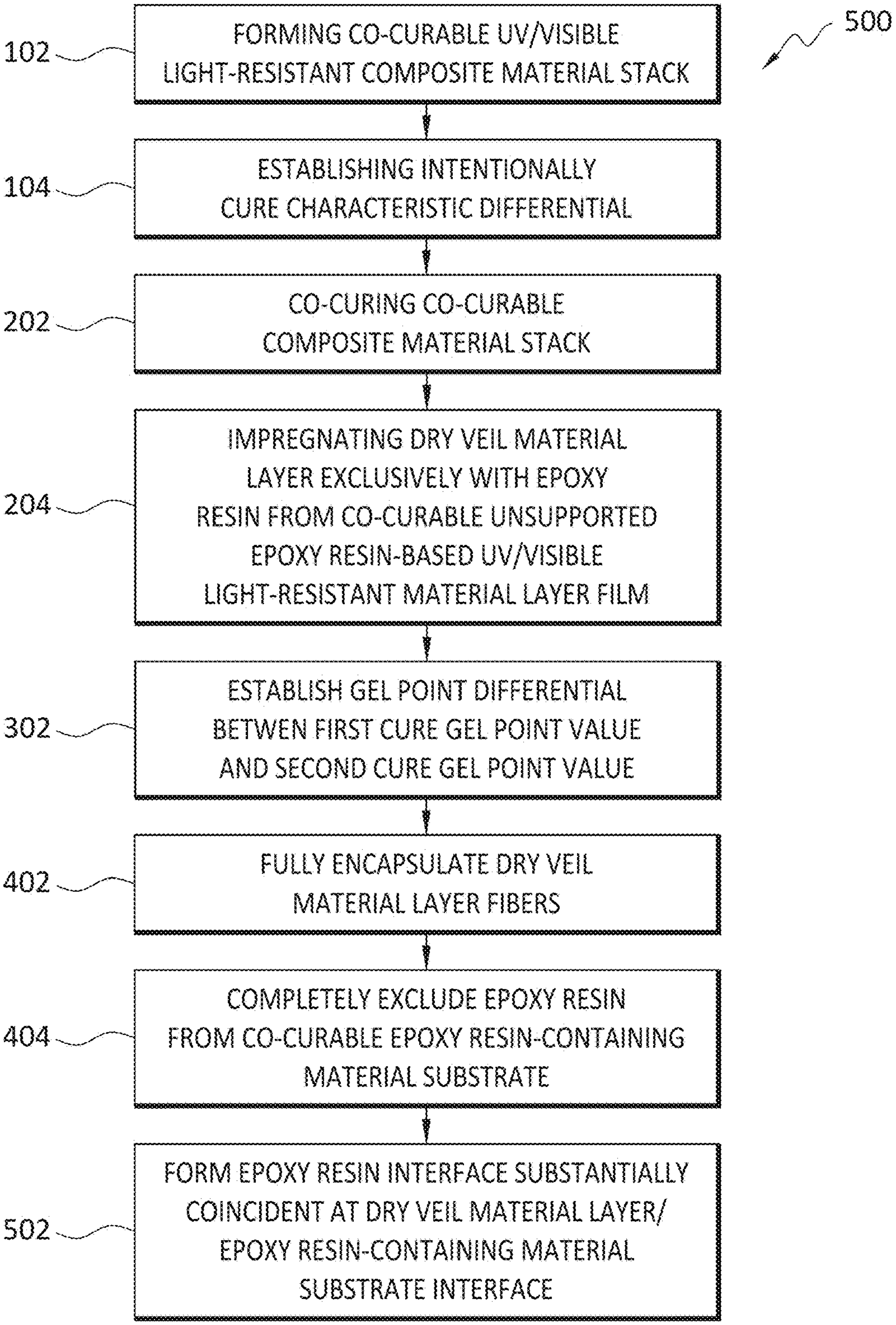
Figure 10:
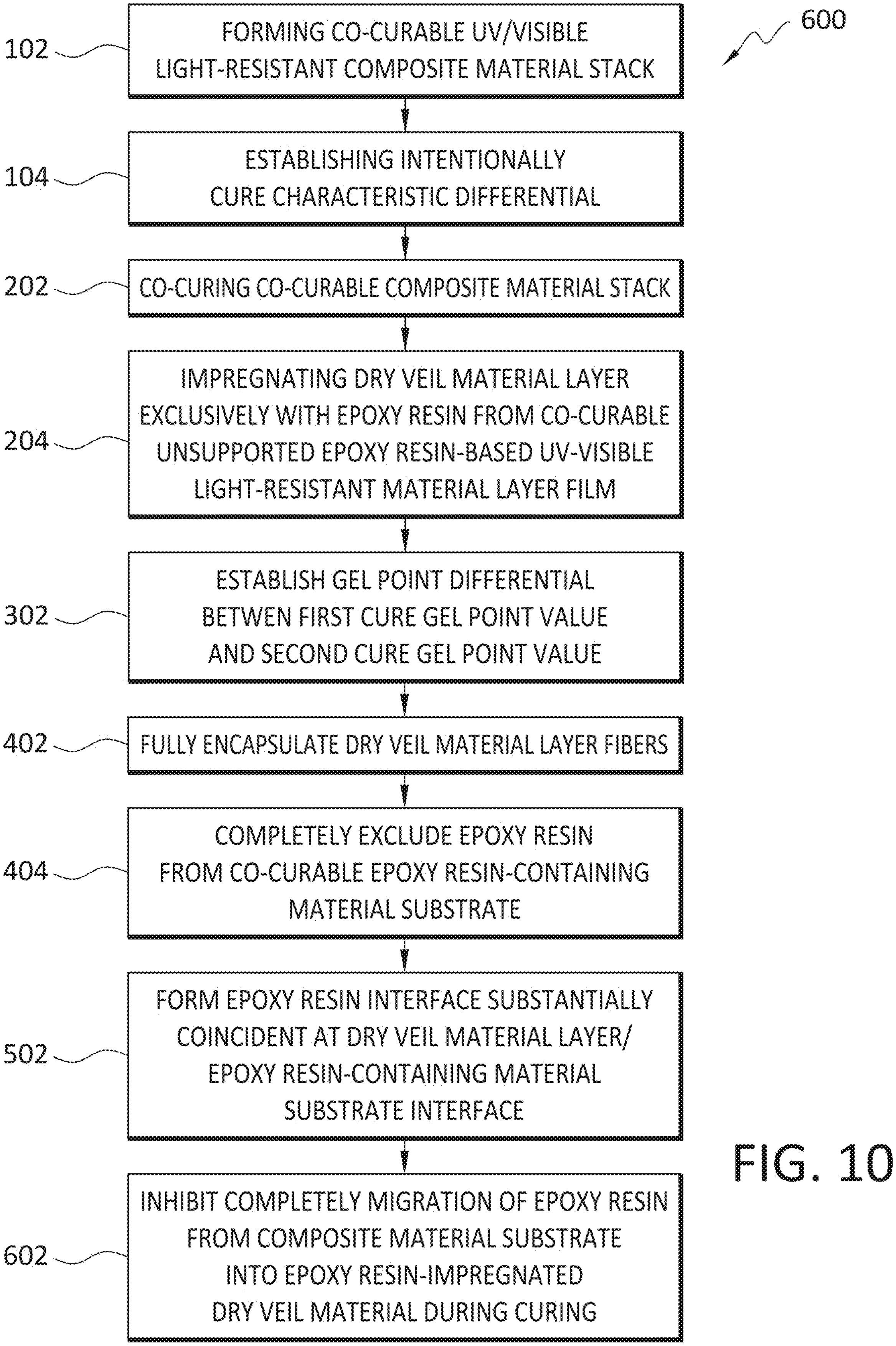
Figure 11A:
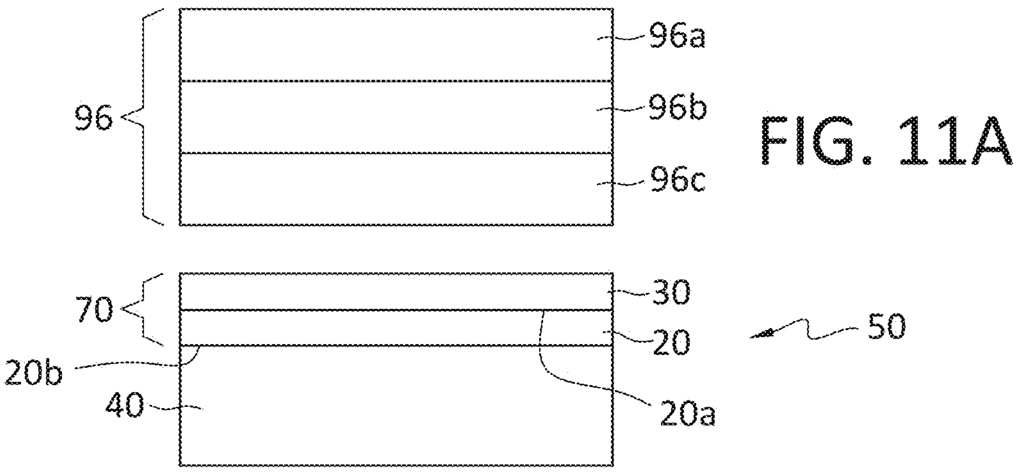
Figure 11B:
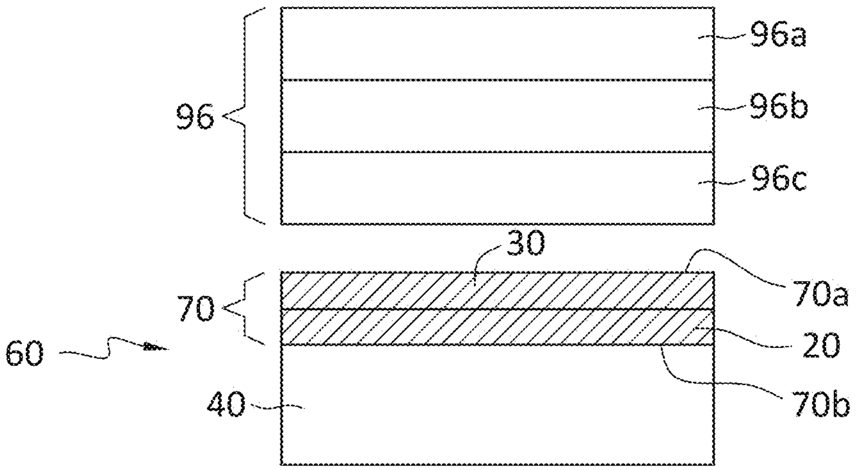
Figure 11C:
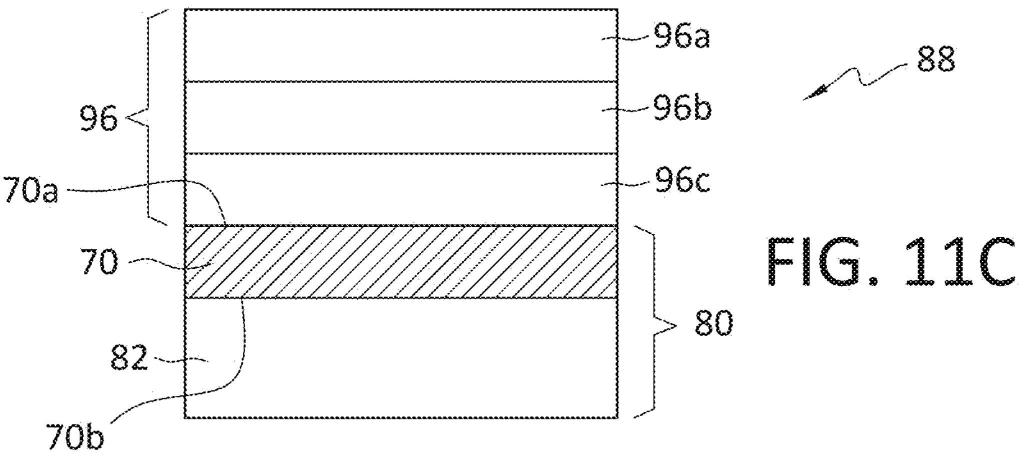
Figure 12A:
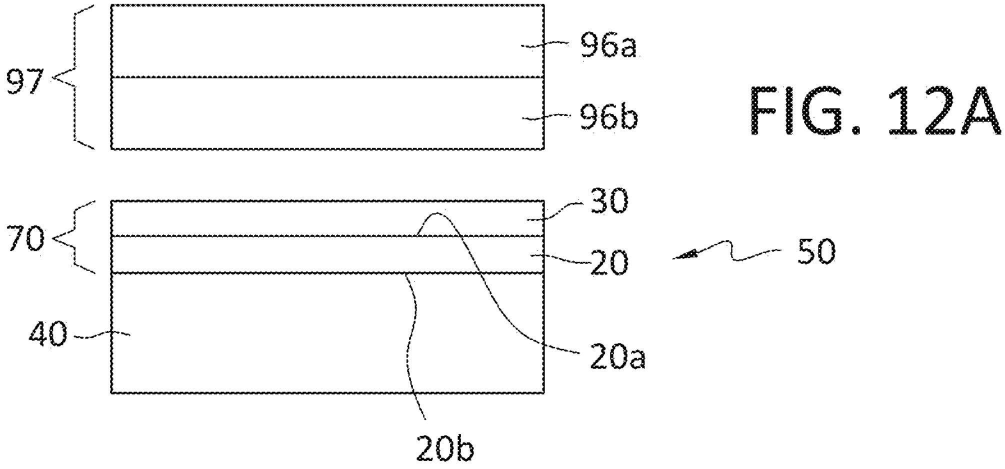
Figure 12B:
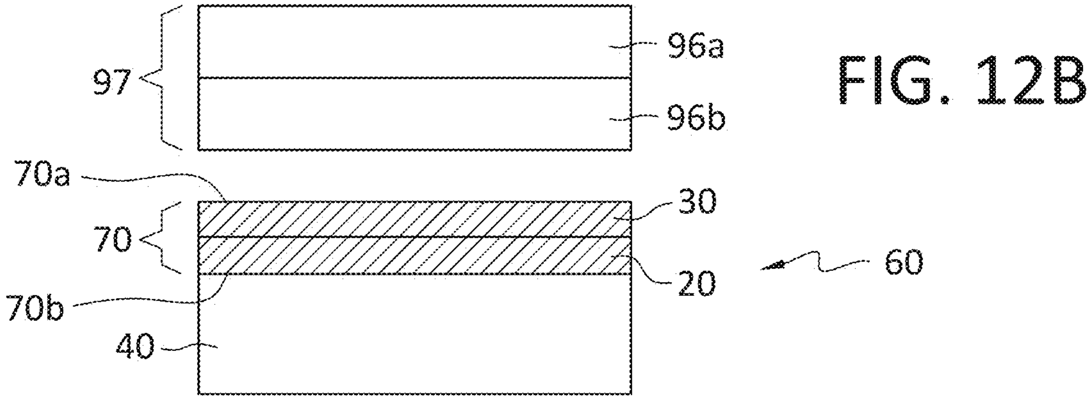
Figure 12C:
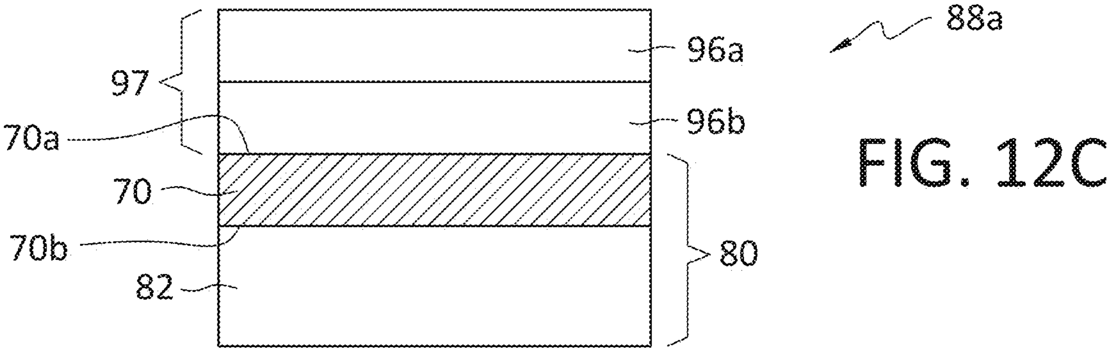
Figure 13A:
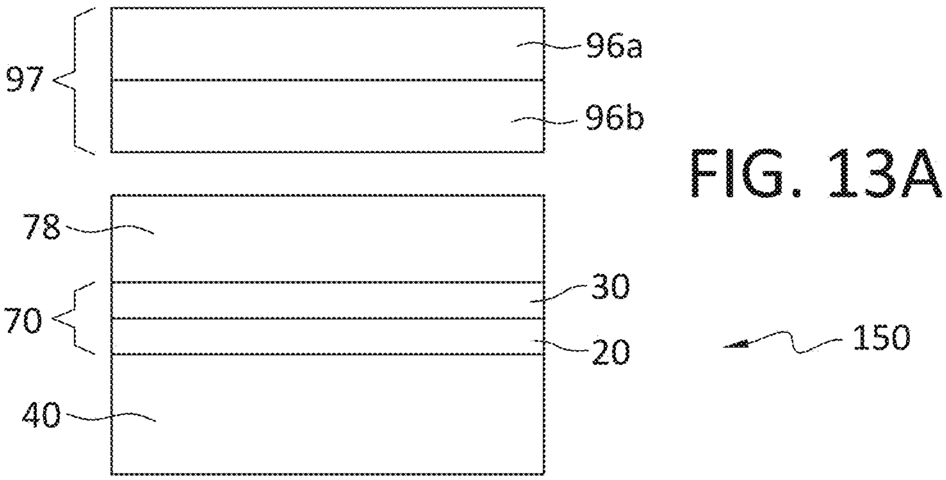
Figure 13B:
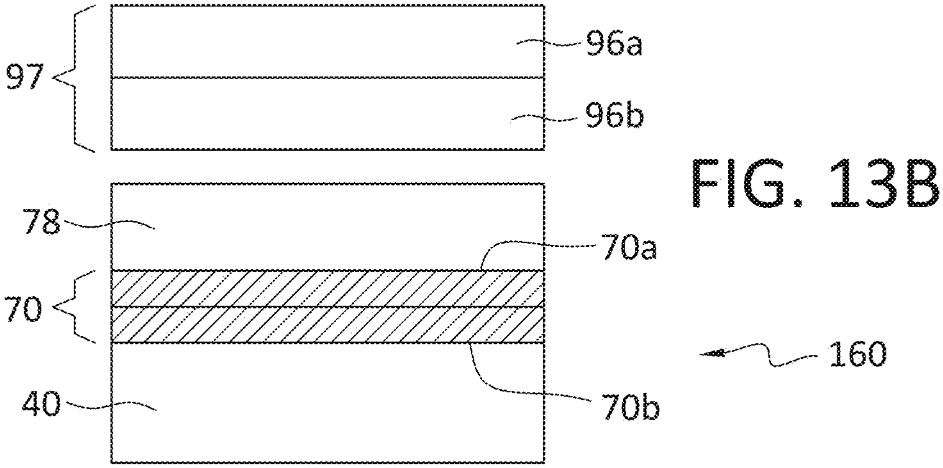
Figure 13C:
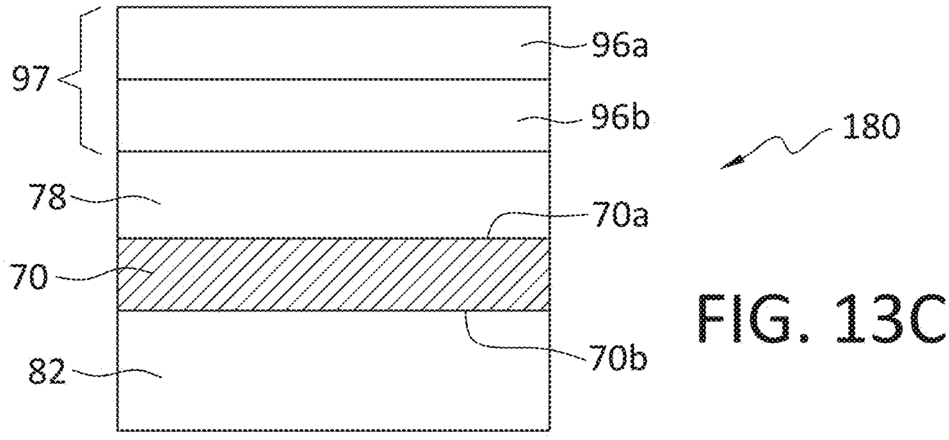
Figure 14A:
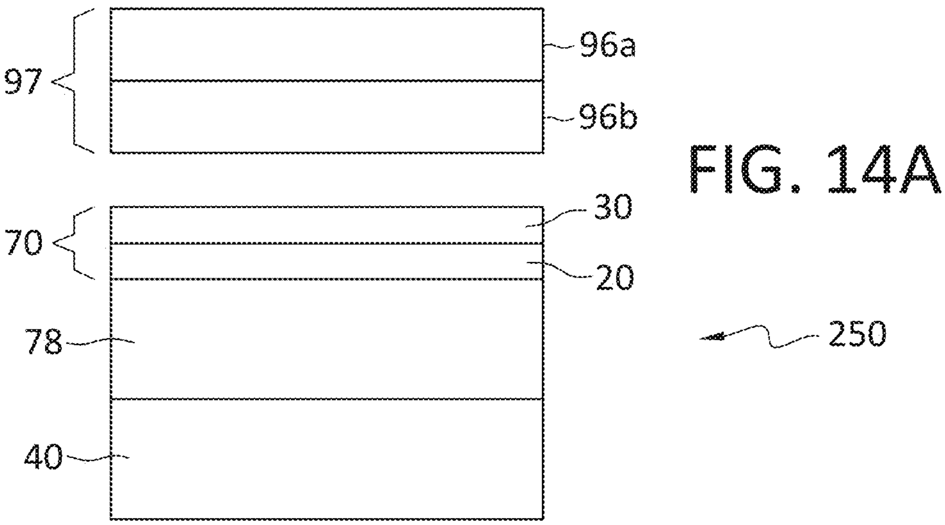
Figure 14B:
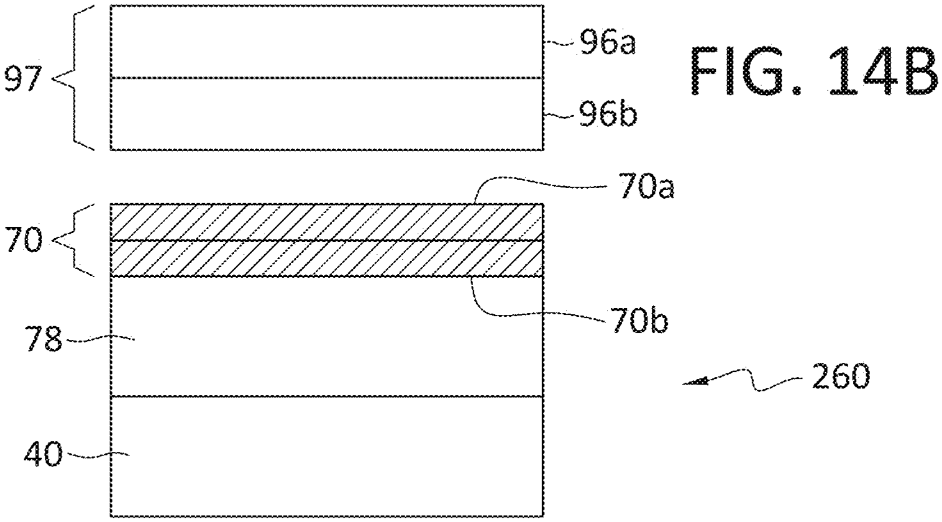
Figure 14C:
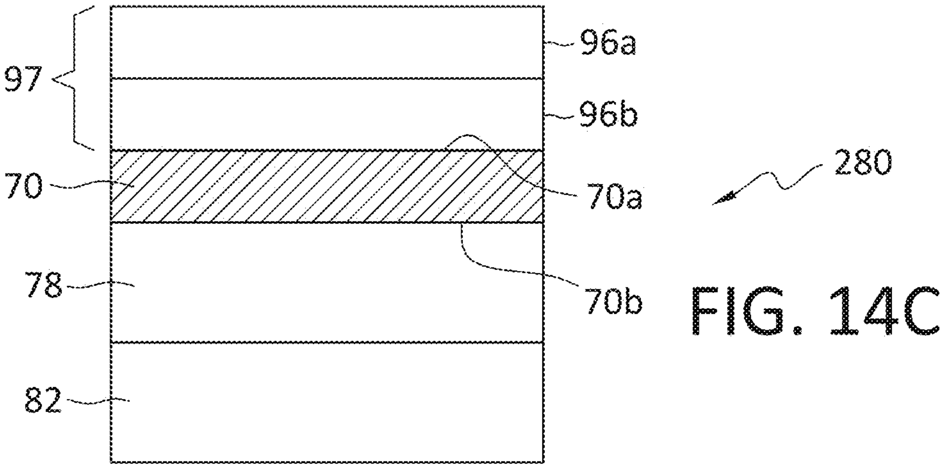
Figure 15:
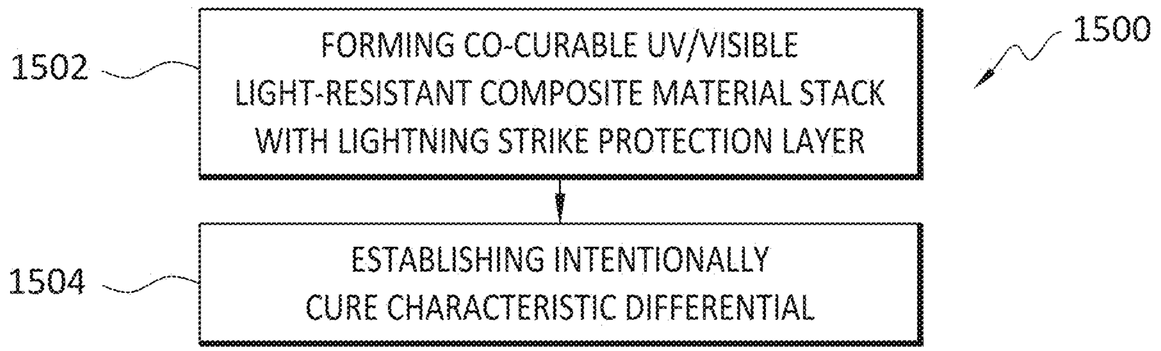
Figure 16:
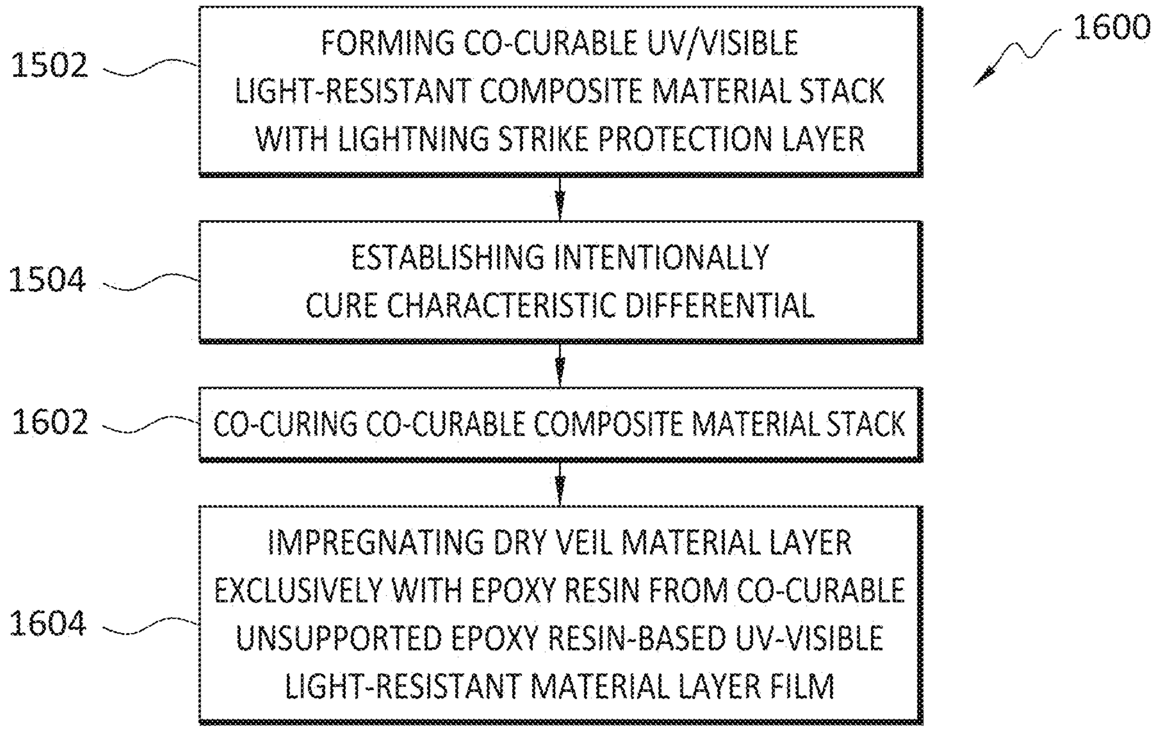
Figure 17:
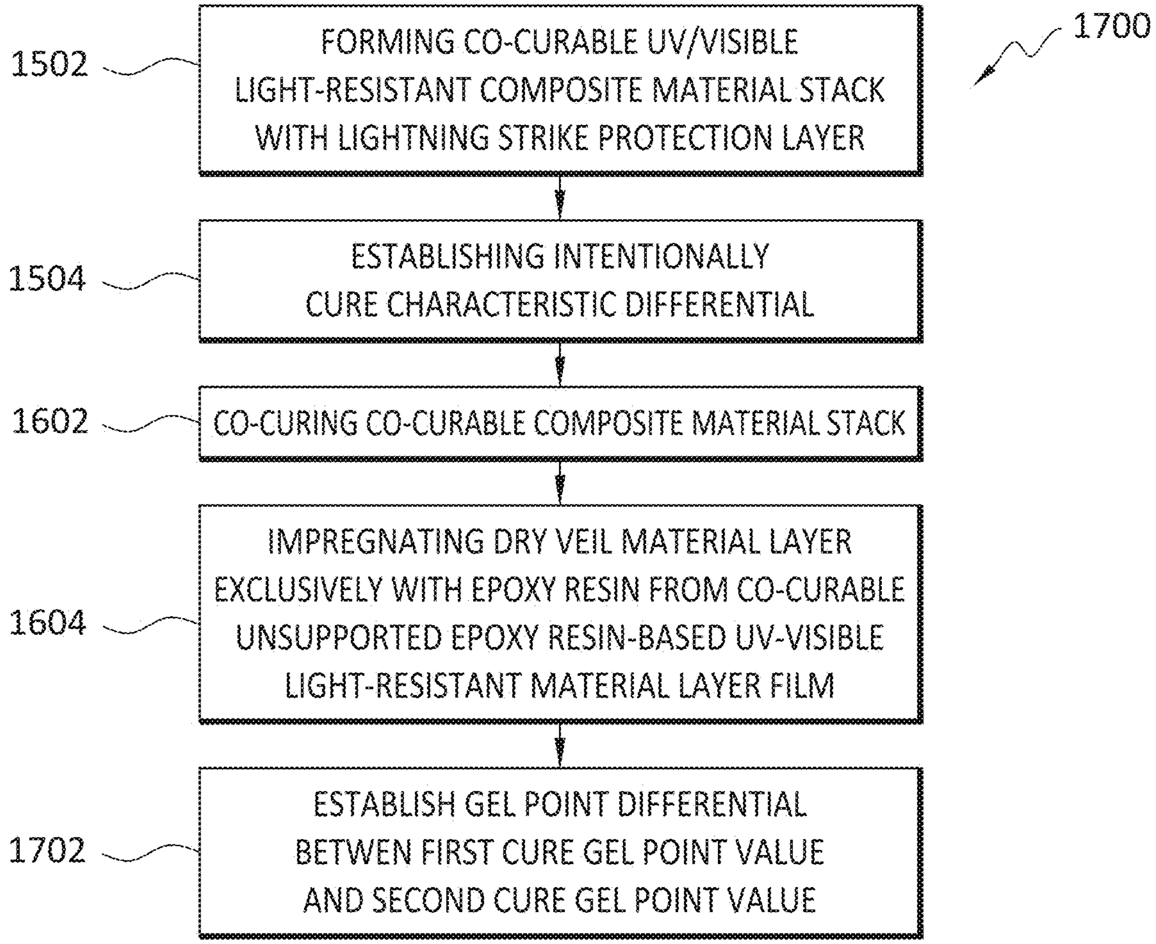
Figure 18:
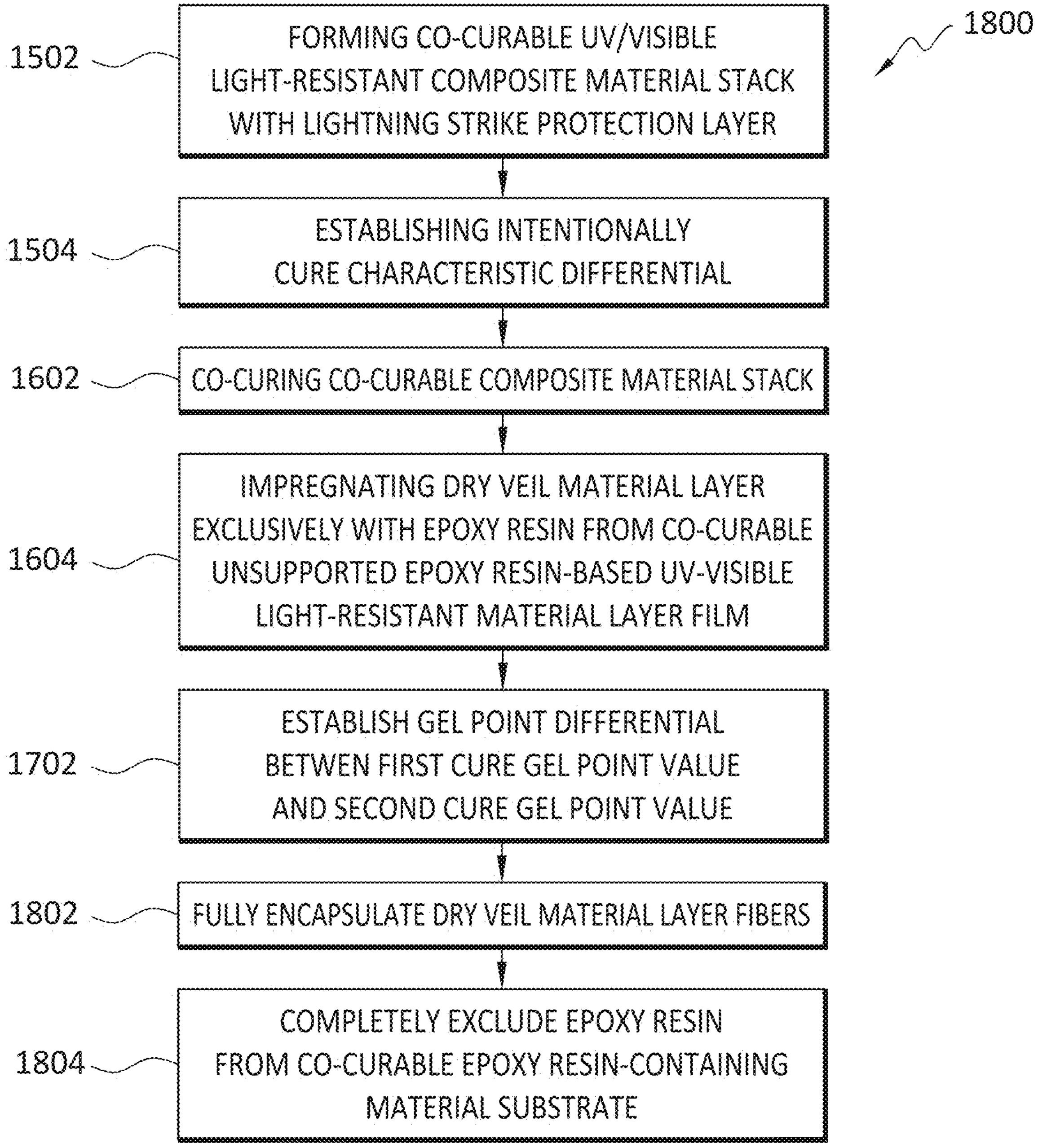
Figure 19:
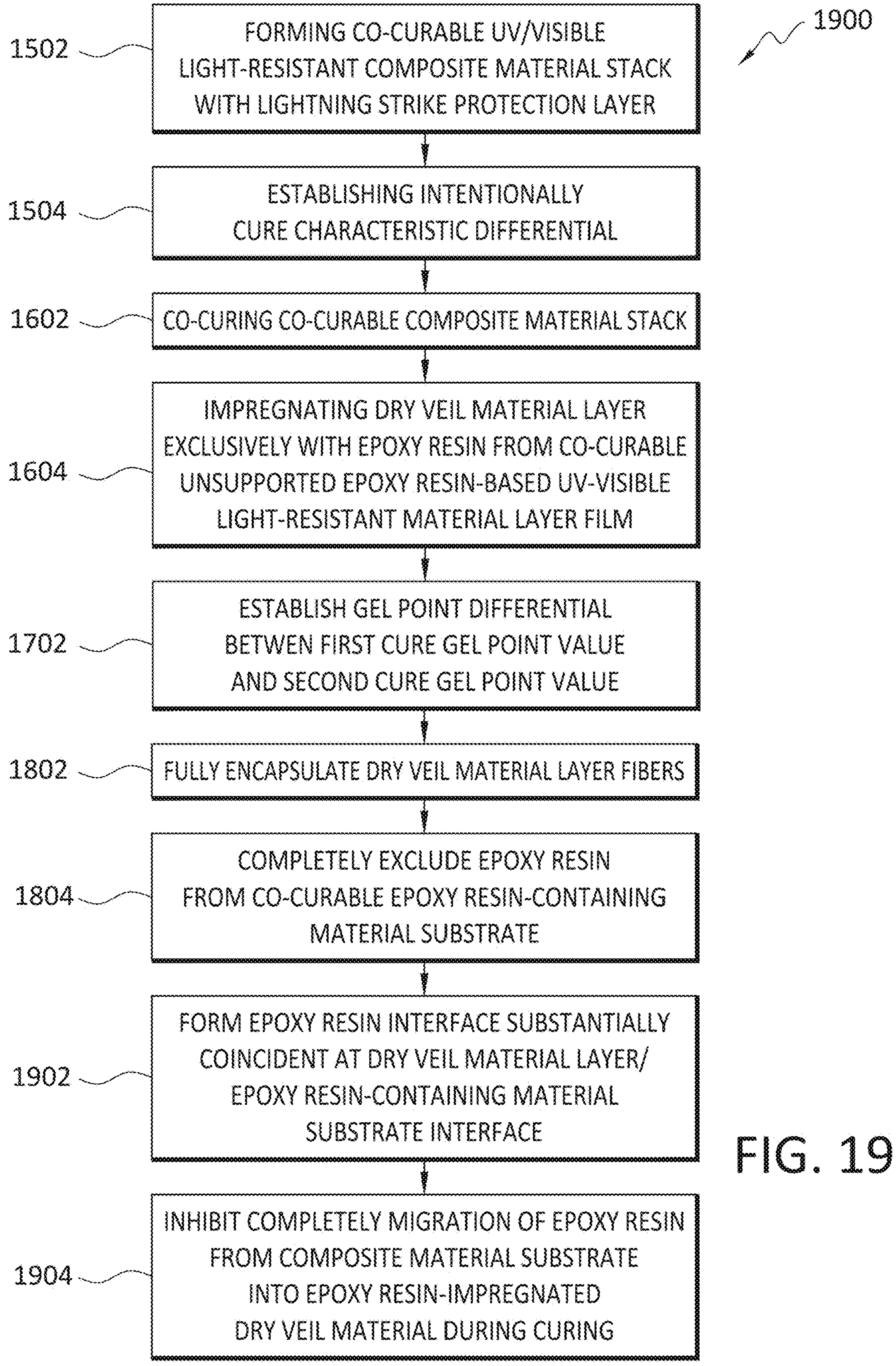

Having thus described variations of the disclosure in general terms, reference will now be made to the accompanying drawings, which are not necessarily drawn to scale, and wherein:

FIG. 1 is an illustration of an aircraft comprising aircraft structures, according to present aspects;

FIG. 2A is a perspective view of a present co-curable composite material stack component in the form of a dry veil material layer, according to present aspects;

FIG. 2B is a perspective view of a present co-curable composite material stack component in the form of an unsupported epoxy resin-based UV/visible light-resistant material layer film, according to present aspects;

FIG. 2C is a perspective view of a present co-curable composite material stack component in the form of an epoxy-resin-containing composite material substrate, according to present aspects;

FIG. 3 is a perspective view of a co-curable composite material stack exposed to a selected co-curing regimen and progressing from a co-curable state to a co-cured state, according to present aspects;

FIG. 4 is a cross-sectional side view of a co-curable composite material stack exposed to a selected co-curing regimen and progressing from a co-curable state to a co-cured state, according to present aspects;

FIG. 5 is a flowchart outlining a method, according to present aspects;

FIG. 6 is a flowchart outlining a method, according to present aspects;

FIG. 7 is a flowchart outlining a method, according to present aspects;

FIG. 8 is a flowchart outlining a method, according to present aspects;

FIG. 9 is a flowchart outlining a method, according to present aspects;

FIG. 10 is a flowchart outlining a method, according to present aspects;

FIG. 11A is a representative cross-section side view of a co-curable composite material stack, according to present aspects;

FIG. 11B is a representative cross-section side view of a co-cured composite material stack, according to present aspects;

FIG. 11C is a representative cross-section side view of a co-cured composite material stack, according to present aspects;

FIG. 12A is a representative cross-section side view of a co-curable composite material stack, according to present aspects;

FIG. 12B is a representative cross-section side view of a co-cured composite material stack, according to present aspects;

FIG. 12C is a representative cross-section side view of a co-cured composite material stack, according to present aspects;

FIG. 13A is a representative cross-section side view of a co-curable composite material stack including a lightning strike protection layer, according to present aspects;

FIG. 13B is a representative cross-section side view of a co-cured composite material stack including a lightning strike protection layer, according to present aspects;

FIG. 13C is a representative cross-section side view of a co-cured composite material stack including a lightning strike protection layer, according to present aspects;

FIG. 14A is a representative cross-section side view of a co-curable composite material stack including a lightning strike protection layer in position immediately adjacent the composite material substrate, according to present aspects;

FIG. 14B is a representative cross-section side view of a co-cured composite material stack including a lightning strike protection layer immediately adjacent the composite material substrate, according to present aspects;

FIG. 14C is a representative cross-section side view of a co-cured composite material stack including a lightning strike protection layer immediately adjacent the composite material substrate, according to present aspects;

FIG. 15 is a flowchart outlining a method, according to present aspects;

FIG. 16 is a flowchart outlining a method, according to present aspects;

FIG. 17 is a flowchart outlining a method, according to present aspects;

FIG. 18 is a flowchart outlining a method, according to present aspects; and FIG. 19 is a flowchart outlining a method, according to present aspects.

DETAILED DESCRIPTION

According to present aspects, a co-curable composite material stack that is in the form of discrete composite material stack layers is selected in construction for multiple selected purposes that include, enhanced composite material performance, enhanced tailorability of composite material performance, enhanced UV/visible light-resistance afforded to the composite material in the curable and cured state, significantly enhanced UV/visible light-resistance retained within and at a dedicated UV/visible light-resistant layer to impart significantly enhanced UV/visible light-resistance to the overall co-curable and co-cured composite material, including significantly reduced detrimental UV/visible light impact incurred by the composite material substrate. According to present aspects, UV/visible light-resistance is significantly improved by enhancing the isolation and/or sequestering of the UV/visible light-resistance capability of a UV/visible light-resistant layer within the composite material stack and toward a surface region of the composite material, and that can serve as a highly effective UV/visible light-resistant composite material layer coating for a composite material substrate.

In a present aspect, a co-curable composite material stack is selectively and intentionally constructed comprising a co-curable epoxy resin-based composite material substrate (referred to equivalently herein as the composite material "base" layer, and/or the composite material substrate, and/or the structural layer, and/or the composite material substrate layer, and/or the composite material structural layer). The presently disclosed epoxy resin-based material in the co-curable epoxy resin-based composite material substrate can includes a fiber reinforced polymer composite material that can have an epoxy resin-based matrix, and that can include a carbon fiber reinforced composite material. In present aspects, the epoxy resin-based material in the co-curable composite material substrate can be any suitable material that can be co-cured with a co-curable epoxy-based material layer at a suitable co-curing regimen as set forth herein. According to present aspects, the epoxy resin-based composite material substrate can be an epoxy-resin-containing carbon fiber reinforced plastic (CFRP) composite material.

Structural composite materials are often layered into laminates that have a selected number of composite material layers, often called "prepregs". Prepregs can be "pre-impregnated" composite fibers where a matrix material, such as carbon fiber reinforcement is already present. The fibers often take the form of a weave, and the matrix is used to bond them together and to other components during manufacture. The composite matrix material is typically partially cured to allow easy handling. Such composite matrix material may require cooled or cold storage to prevent further partial curing, or complete curing, and such composite matrix material can include a material referred to as a B-Stage material. Consequently, B-Stage prepregs are stored in cooled or cold storage areas, as ambient heat can accelerate complete polymerization. Prepregs also allow one to impregnate a bulk amount of fiber with epoxy-based resin and then store the prepreg in cooled or cold storage areas for an extended time until a later cure. Prepreg plies may be applied to tools which are flat or contoured depending upon the fabrication process used. Multiple layers of prepreg plies can be used to make a desired shape using shaping or forming tools, also called mandrels. Present aspects contemplate, but are not limited to, the use of a selected number of laid up layers of composite material prepregs to form a co-curable and co-cured composite material substrate.

According to present aspects, significantly enhanced UV/visible light-resistance is exclusively, completely, and substantially 100% provided to the composite material stack in at least a co-cured state by providing a co-curable unsupported epoxy resin-based surface layer (referred to equivalently herein as the co-curable unsupported epoxy resin-based surface layer film, that can be a single layer film) comprising a selected amount of UV/visible light-resistant material, with the unsupported epoxy resin-based UV/visible light-resistant material layer configured to be highly compatible with the epoxy resin in the composite material substrate, but that does not sustain or otherwise incur or realize any commingling with the epoxy resin in the co-curable and co-cured epoxy resin-based composite material substrate before, subsequent to, and/or during co-curing. The term "unsupported" as used herein refers to an epoxy resin-based material film that does not include a fiber matrix and therefore itself lack a structural "support".

In a further present aspect, the unsupported epoxy resin-based UV/visible light-resistant material layer film further comprises a UV/visible light resistivity value of about 12,000 kJ/m$^2$ for full spectrum UV light at a UV wavelength ranging from about 300 to about 400 nm, and about 43,000 KJ/m$^2$ at a visible light wavelength ranging from about 400 to about 700 nm at an unsupported epoxy resin-based UV/visible light-resistant material layer film thickness ranging from about 0.0001 to about 0.010 inches.

The present co-curable composite material stack further includes a dry veil material layer that is interposed between the unsupported epoxy resin-based UV/visible light-resistant material layer and the composite material substrate. The dry veil material layer (referred to equivalently here as the "dry veil") comprises a dry veil fibers in a fiber network that can comprise a woven material, and with the dry veil fibers comprising metal fibers, glass fibers, carbon fibers, polymer fibers, natural-product fibers, and combinations thereof. Natural-product fiber is defined herein as a fiber derived from a naturally-occurring source (e.g., cotton, etc.) and that can further be processed into a machined fiber. The dry veil fibers can further comprise coated metal fibers, coated glass fibers, coated carbon fibers, coated polymer fibers, coated natural-product fibers, and combinations thereof. In addition, the dry veil fibers can further comprise metal-coated metal fibers, metal-coated glass fibers, metal-coated carbon fibers, metal-coated polymer fibers, metal-coated natural-product fibers, and combinations thereof.

In one present aspect, during co-curing, the dry veil material layer is configured to exclusively accept, into the dry veil material fiber matrix, a selected "flow" of epoxy resin-based material originating from and/or derived from only from the unsupported epoxy resin-based UV/visible light-resistant material layer. As stated herein, the dry veil material fibers can further comprise a fiber coating layer on the fibers.

According to a present example, the dry veil material layer can comprise metal fibers, and/or can comprise metal-containing fibers, and/or can comprise metal-containing fiber coating(s). According to present aspects, the dry veil material layer can be configured to comprise a selected conductivity by tailoring the conductive material type (e.g., metal) and by tailoring the conductive material amount, density, content, etc., for the purpose of providing electromagnetic and/or lightning strike protection to the composite material. In one present example, the dry veil material layer can comprise an electrical conductivity ranging from 0.01 milliOhms per square to 0.5 milliOhms per square.

According to present aspects, the physical properties of the co-curable unsupported epoxy resin-based UV/visible light-resistant material layer are intentionally selected and are otherwise tailored to exhibit and possess a first cure characteristic that can include and that can be quantified in terms of having at least one of a first gel point temperature value a first gel time value, and a first curing viscosity value. In addition, the physical properties of the co-curable epoxy resin-based composite material substrate are intentionally selected and are otherwise tailored to exhibit and possess an induced second cure characteristic that can include and that can be quantified in terms of having at least one of a second gel point temperature value, a second gel time value, and a second curing viscosity value. "Gel point" is defined herein as the point at which a material achieves a specific viscosity at a specific temperature.

Accordingly, a first cure characteristic in the form of a first gel point value of the co-curable unsupported epoxy resin-based UV/visible light-resistant material layer is intentionally selected so that the epoxy resin-based material will establish a "flow" at a lower gel point temperature than the co-curable epoxy resin located within the co-curable composite material substrate having the induced second cure characteristic in the form of the second gel point value.

That is, according to present aspects, during a co-curing regimen that can include a temperature increase and/or a pressure increase, dwell periods at selected temperatures over a selected time, etc., as the first gel point temperature is neared and achieved, an epoxy resin material flow will only be initiated and established within and from the epoxy resin in the co-curable unsupported epoxy resin-based UV/visible light-resistant material layer having the first cure characteristic (e.g., the first gel point value). In this way, according to a present example, when the first gel point temperature is reached, epoxy resin exclusively from the co-curable unsupported epoxy resin-based UV/visible light-resistant material layer will intentionally and selectively migrate (e.g., will be the only epoxy resin present in the composite material stack to migrate) into and otherwise infiltrate and/or impregnate the dry veil material layer until the dry veil material layer fibers are substantially completely infiltrated and substantially completely coated with epoxy resin-based material sourced only (e.g., originating only) from the co-curable unsupported epoxy resin-based UV/visible light-resistant material layer.

The first cure characteristic(s) of the co-curable unsupported epoxy resin-based UV/visible light-resistant material layer will then result in the curing of the epoxy resin in the formerly co-curable unsupported epoxy resin-based UV/visible light-resistant material layer that is now "supported" by the infiltrated dry veil material layer into which the co-curable unsupported epoxy resin-based UV/visible light-resistant material layer has migrated, to now form a co-curing and co-cured UV/visible light-resistant material layer that now includes the infiltrated dry veil material layer.

As a selected composite material co-curing regimen increases in temperature and/or pressure, the temperature will rise above the first gel point temperature and reach a second gel point temperature at least for the purpose of co-curing the composite material substrate. At the second gel point temperature, the epoxy resin in the composite material substrate will cure without entering the dry veil material that has been previously infiltrated and otherwise "occupied" by the curing and cured epoxy resin released from the previously unsupported epoxy resin-based co-curable UV/visible light-resistant material layer into the dry veil material layer.

According to present aspects, no commingling (e.g., during co-curing) of epoxy resins from the present epoxy-containing substrate material and the present unsupported UV/visible light-resistant epoxy-based material layer coating occurs. This is in contrast to past composite material systems, where commingling of epoxy resins from distinct layer types in a composite material stack could result in a miscible epoxy resin region containing the two epoxy resins. According to a present aspect, no miscible epoxy resin region containing epoxy-based resins from differing epoxy-based resin sources is formed, as no commingling of epoxy-based resins from differing epoxy resin-based material sources is permitted to occur.

According to present aspects, the placement of the dry veil material layer in the composite material stack into which only epoxy resin from the co-curable unsupported epoxy resin-based UV/visible light-resistant material layer flows, and the intentionally selected first cure characteristic of the co-curable unsupported epoxy resin-based UV/visible light-resistant material layer, in combination with the selected curing regimen and the intentionally selected induced second cure characteristic of the epoxy resin containing composite substrate intentionally significantly increases the sequestration of, isolation of, and the retaining of, the maximum degree of UV/visible light-resistance at the surface of the co-cured composite material stack. As state herein, the UV/visible light-resistance capability in the present co-curable and co-cured composite material stack is exclusively (e.g., 100%) provided to the stack by the co-curable unsupported epoxy resin-based UV/visible light-resistant material layer.

According to present aspects, the co-curable composite material "stack" is intentionally arranged, with co-curable material layers intentionally selected and positioned in the stack having a differential curing characteristic (referred to equivalently herein as a differential cure characteristic) intentionally established between the first cure characteristic of the co-curable unsupported epoxy resin-based UV/visible light-resistant material and the induced second cure characteristic of the co-curable epoxy resin-containing material substrate.

For example, the selected first cure characteristic in the form a selected first gel point temperature value of the co-curable unsupported epoxy resin-based UV/visible light-resistant material layer can be achieved at an intentionally selected gel point temperature and/or resin gel time, with examples of selected first gel point temperature including, for example, temperatures of at least 60 degrees Celsius (° C.), at least 65° C., at least 70° C., at least 75° C., at least 80° C., at least 85° C., at least 90° C., at least 95° C., at least 100° C., at least 105° C., at least 110° C., at most 150° C., at most 145° C., at most 140° C., at most 140° C., at most 135° C., at most 130° C., at most 125° C., at most 120° C., at most 115° C., at most 110° C., at most 105° C., at most 100° C., at most 95° C., at most 90° C., at most 85° C., and/or at most 80° C. Stated differently, the selected first gel point temperature value can be bounded by any of the stated temperatures.

In addition, the first gel point heating time can have a selected magnitude and/or value, and/or duration that can be selected based, at least in part, on one or more desired properties of the unsupported epoxy resin-based UV/visible light-resistant material layer including, the unsupported epoxy resin-based UV/visible light-resistant material layer curing viscosity, the unsupported epoxy resin-based UV/visible light-resistant material layer gel point temperature value, and/or the unsupported epoxy resin-based UV/visible light-resistant material layer gel time.

The selected second gel point temperature value of the selected induced second cure characteristic of the co-curable epoxy resin-containing material substrate can be achieved at a selected gel point temperature and/or resin gel time, with examples of selected first gel point temperature including, for example, temperatures of at least 150 degrees Celsius (° C.), at least 155° C., at least 160° C., at least 165° C., at least 170° C., at least 175° C., at least 180° C., at least 185° C., at least 190° C., at least 195° C., at least 200° C., at most 260° C., at most 250° C., at most 240° C., at most 230° C., at most 220° C., at most 210° C., at most 200° C., at most 195° C., at most 190° C., at most 185° C., at most 175° C., at most 170° C., at most 165° C., at most 160° C., and/or at most 155° C. Stated differently, the selected second gel point temperature value can be bounded by any of the stated temperatures.

In addition, the second gel point heating time can have a selected magnitude and/.or value, and/or duration that can be selected based, at least in part, on one or more desired properties of the co-cured composite material substrate and the overall co-cured composite material, the curing viscosity of the epoxy-resin of the composite material substrate, the gel point temperature value of the epoxy-resin of the composite material substrate, and/or gel time of the epoxy-resin of the composite material substrate.

As stated herein, a differential curing value (referred to equivalently herein as a differential curing characteristic value) is intentionally established between the epoxy resin contained within the co-curable unsupported epoxy resin-based UV/visible light-resistant material layer and the epoxy resin contained within the co-curable epoxy resin-containing composite material substrate, for example, by including components in each layer that can selectively impact selected cure kinetics advantageously to achieve a desired cure characteristic differential.

In one present aspect, the uncured (e.g., the co-curable) unsupported epoxy resin-based UV/visible light-resistant material layer comprises, as a first cure characteristic, a first gel point temperature value (the temperature or "point" at which the material begins to "gel" from a solid to at least a semi-liquid state) that is below 150° C.; and the uncured (e.g., the co-curable) epoxy resin-containing composite material substrate comprises, as an induced second cure characteristic, a second gel point temperature value that is above 150° C.

With respect to gel point temperature value as the cure characteristic, according to present aspects, a gel point temperature value differential is established and is otherwise intentionally induced between the gel point temperature value of the co-curable unsupported epoxy resin-based UV/visible light-resistant material layer (e.g., the first cure characteristic) and the gel point temperature value of the co-curable composite material substrate (e.g. the induced second cure characteristic). In some present aspects, the gel point temperature value differential between the co-curable unsupported epoxy resin-based UV/visible light-resistant material layer and the co-curable composite material substrate can be at least 2° C., at least 4° C., at least 6° C., at least 8° C., at least 10° C., at least 15° C., at most 2° C., at most 4° C. at most 6° C. at most 8° C. at most 10° C. at most 12° C., at most 15° C., and at most 100° C. Stated another way, the gel point temperature value differential range between the co-curable unsupported epoxy resin-based UV/visible light-resistant material layer and the co-curable composite material substrate can be bounded by any of the gel point temperature values listed herein.

According to present aspects, the co-curable epoxy resin in the composite material substrate and the co-curable epoxy resin in the unsupported epoxy resin-based UV/visible light-resistant material layer are selected intentionally to have, and are otherwise induced and/or tailored to have at least one differing cure characteristic that establishes a cure characteristic differential (e.g., a differential in a cure characteristic value) between the co-curable unsupported epoxy resin-based UV/visible light-resistant material layer (that has the first cure characteristic(s) and the co-curable composite material substrate (that has the induced second cure characteristic(s)).

According to present aspects, the cure characteristic, upon and/or during curing (including co-curing) of the epoxy resin in the composite material substrate can have a curing viscosity value that is less than the curing viscosity value of the epoxy resin in the unsupported epoxy resin-based UV/visible light-resistant material layer (and thus establishing an intentionally induced present curing viscosity value differential between the co-curable composite material substrate and the unsupported epoxy resin-based UV/visible light-resistant material layer).

In addition, according to present aspects, the epoxy resin in the composite material substrate is intentionally selected and/or is intentionally induced and/or tailored to have an epoxy resin gel point temperature value that is greater than the epoxy resin gel point temperature value of the epoxy resin in the unsupported epoxy resin-based UV/visible light-resistant material layer (thus establishing an intentionally induced present epoxy resin gel point temperature value differential between the co-curable composite material substrate and the unsupported epoxy resin-based UV/visible light-resistant material layer).

Still further, according to present aspects, the epoxy resin of the composite material substrate is selected to have a structural resin gel time value that is greater than the epoxy resin gel time value of the epoxy resin in the co-curable unsupported epoxy resin-based UV/visible light-resistant material layer (thus establishing an intentionally induced present resin gel time value differential between the composite material substrate and the unsupported epoxy resin-based UV/visible light-resistant material layer).

In one present aspect, the uncured (e.g., the co-curable) unsupported epoxy resin-based UV/visible light-resistant material layer comprises, as a first cure characteristic, a first gel point temperature value (the point at which the material begins to "gel" from a solid to at least a semi-liquid state) at a temperature that is below 150° C., and the uncured (e.g., the co-curable) epoxy resin-containing composited material substrate comprises, as an induced second cure characteristic, has a second gel point temperature value (the point at which the material begins to "gel" from a solid to at least a semi-liquid state) at a temperature that is above 150° C.

The presently disclosed co-curable epoxy resin-containing composite material substrate (that can be a one discrete epoxy resin source at least for adjoining material layers in a "stack" during co-curing) and the presently disclosed co-curable unsupported epoxy resin-based UV/visible light-resistant material layer (that can be another discrete epoxy resin source at least for adjoining material layers in a "stack" during co-curing) in the present co-curable material stack are positioned on opposite sides of the present dry veil material layer. While compatible epoxy resin types can be desired to achieve desired co-cured material properties for the overall co-cured composite material "stack", the present co-curable composite material "stacks" comprise material layers comprising epoxy resins with differing cure characteristics that include a differing gel point, with the differing resins configured to establish a selected differential cure viscosity such that the epoxy resin in the unsupported epoxy-based UV/visible light-resistant material layer is configured to intentionally "wet out" in advance of the epoxy resin in the epoxy-containing composite substrate.

The tailorability and flexibility facilitated in the design of the present composite materials allows the selected incorporation of a selected dry veil material into a co-curable composite material stack (e.g., for the preparation of a co-curable composite material panel), with the dry veil material layer intentionally impregnated and infiltrated exclusively by (and with the dry veil material layer fibers coated by and dry veil material interstitial spaces completely filled by) only the unsupported film layer components, with the unsupported epoxy-based UV/visible light-resistant material layer film characteristics (e.g., UV/visible light-resistance, etc.) being selectively and exclusively "transferred" only into the desired dry veil material that then forms, (upon infiltration into the dry veil material of the unsupported epoxy-based film layer and curing), a supported composite material stack layer that now exclusively comprises the characteristics of the unsupported film layer now present in the infiltrated dry veil layer. The infiltrated dry veil material layer can then, upon curing, provide support to the unsupported layer film as, if desired and, for example, a supported composite material surface layer including a surface layer configured in an untreated state to accept subsequent layers that can include aircraft livery layers (primers, topcoats, etc.) and/or configured to be treated to accept subsequent layers that can include aircraft livery layers (primers, topcoats, etc.).

In one present example, when the unsupported epoxy-resin film "wets out" and exclusively infiltrates the dry veil material layer, UV/visible light-resistant characteristics and properties of the unsupported epoxy-resin based UV/visible light-resistant material layer film (that are exclusively incorporated into a dry veil material layer in the composite material stack) are now incorporated into the composite material stack, as the formerly dry veil material layer is infiltrated exclusively with co-curable epoxy-resin from the unsupported film layer. The formerly dry veil material that was "dry" in the co-curable composite material stack in the co-curable state is no longer "dry" during the curing regimen, and once the first gel point is attained, after co-curing, a supported co-cured composite material layer (that can be a surface layer) is formed.

After co-curing, the UV/visible light-resistant properties of the co-curable unsupported epoxy resin-based UV/visible light-resistant material layer now reside exclusively (and undiluted by epoxy resin from any other co-curable composite material stack layer) in the surface layer of the composite material in the co-cured state that includes the formerly "dry" veil material. That is, no resin migration from the composite material substrate or from any other layer in the co-curable composite material stack migrates into the dry veil material layer before, during, and/or after co-curing.

This selected exclusive infiltration of selected epoxy resin into the dry veil material layer from the unsupported film layer significantly improves tailorability of final characteristics in a co-cured composite material, as no dilution of a desired resin material in a surface layer having selected properties (e.g. UV/visible light-resistance) occurs. Stated differently, according to present aspects, and such "dilution" is significantly inhibited and/or substantially completely prevented. That is, according to present aspects, no mixing of resin from different material layer sources occurs before, during, or after co-curing within the surface layer that now incorporates the resin-infiltrated and formerly "dry" veil material layer that now can occupy a location at or near the surface of the composite material in the cured state. In addition, according to present aspects, there is no creation of a miscible region comprising any epoxy resins commingled from more than one composite material layer source, and no diminishing of characteristics (e.g., UV/visible light-resistance characteristics, etc.) between the selected characteristics of the unsupported film layer and the composite material surface layer that now contains the infiltrated dry veil material layers.

In one present example, with respect to, for example, UV/visible light-resistance, the significantly improved retention of selected characteristics induced into the unsupported film layer now selectively and exclusively introduced into the infiltrated dry veil material layer can significantly improve composite material production and can, at least, for example, significantly economize and otherwise at least: 1) reduce the overall amount of UV/visible light-resistant material incorporated into a particular surface film; 2) reduce the thickness of a UV/visible light-resistant film applied into a co-curable composite material stack; 3) reduce the overall weight of a composite material having a selected degree of UV/visible light-resistance material; 4) reduce the processing cost of UV/visible light composite material in a co-cured state; and 5) eliminate the number of and thicknesses of material layers in a co-curable composite material stack (further reducing weight, cost, and otherwise simplifying complexity for a UV/visible light-resistant composite material, including reducing weight, cost, etc., of aircraft components (e.g., aircraft structures, assemblies, sub-assemblies, etc. comprising the present co-cured composite material), and further reducing weight, operational cost, while extending range, reducing fuel consumption, etc., of aircraft comprising the aircraft composite material components comprising the present co-cured composite material.

FIG. 1 is an illustration of an aircraft 10 comprising a fuselage 12, wings 14, vertical stabilizer 16, and horizontal stabilizers 18, all of which can incorporate and otherwise be made from the presently disclosed co-cured composite materials made from the presently disclosed co-curable composite material stacks.

FIGS. 2A, 2B, and 2C separately illustrate the constituent material layers incorporated into the presently disclosed co-curable UV/visible light-resistant composite material "stack". FIG. 2A is a perspective view of a dry veil material layer 20 that, itself, in the "dry" and non-resin-infiltrated state, may not be a "co-curable" layer. Dry veil material layer 20 can comprise a network of dry veil material layer fibers 22 that can include, for example, metal fibers, glass fibers, carbon fiber, polymer fibers, natural-product fibers, and combinations thereof, including coated fibers coated with a coating that can be a metal-containing coating material. The dry veil material layer fibers 22 (referred to equivalently herein as a fiber network) of the dry veil material layer 20 are shown in FIG. 2A within an enlarged/magnified region appearing within a circular dotted line 24.

FIG. 2B is a perspective view of a presently disclosed co-curable unsupported epoxy resin-based UV/visible light-resistant material layer 30 that can be a single film layer and that comprises an epoxy resin-based material, with the epoxy resin-based material that can be chemically and otherwise compatible with the epoxy resin contained in an epoxy resin-based composite material substrate in the present co-curable composite material "stack", and as disclosed in more detail herein, and as shown at least in FIGS. 3 and 4. The co-curable unsupported epoxy resin-based UV/visible light-resistant material layer 30 contains no fibers or any material that can be considered a "support" material that can provide structure to the unsupported material layer such as, for example, fibers, fibrous material, etc.

In one present example, and as shown in FIG. 2B, the co-curable unsupported epoxy resin-based UV/visible light-resistant material layer 30 can comprise a pigment or other material that can undergo a visually detectable change between co-curable and a co-cured states. That is, as shown in FIG. 2B, co-curable unsupported epoxy resin-based UV/visible light-resistant material layer 30 may contain a pigment, agent, or other material that renders the co-curable unsupported epoxy resin-based UV/visible light-resistant material layer 30 visually detectable with a first "color" 32 in an uncured (e.g., a co-curable) state and, upon being subjected to a co-curing or other curing regimen, can change a visually detectable appearance of the unsupported epoxy resin-based UV/visible light-resistant material layer 30 and otherwise display a visually detectable second "color" 34 in the co-cured state (for example, indicating a successful cured state has been achieved).

FIG. 2C shows a co-curable epoxy resin-containing composite material substrate 40 (e.g., a composite material "base", as disclosed and referred to equivalently herein). The composite material substrate 40 can be designed, and/or can be selected to provide structural integrity, rigidity, stiffness, flexibility, etc., to at least a finished, co-cured composite material structure and/or a composite material structure assembly incorporating the co-cured composite material.

As shown in FIG. 2C, the co-curable epoxy resin-containing composite material substrate 40 can comprise a pigment or other material that can undergo a visually detectable change between a co-curable state and a co-cured state. That is, as shown in FIG. 2C, co-curable epoxy resin-containing composite material substrate 40 may contain and/or otherwise incorporate a pigment, agent, or other material that renders the co-curable epoxy resin-containing composite material substrate 40 visually detectable with a first "color" 42 in an uncured (e.g., a co-curable) state and, upon being subjected to a co-curing or other curing regimen, can change a visually detectable appearance of the epoxy resin-containing composite material substrate 40 and otherwise display a visually detectable second "color" 44 in the co-cured state (for example, indicating a successful cured state has been achieved).

FIGS. 3 and 4 are illustrations of a composite material co-curing process that, according to present aspects, is configured to transform the presently disclosed and improved co-curable (e.g., uncured) epoxy-resin based UV/visible light-resistant composite material assembly "stack" into the presently disclosed and improved co-cured epoxy-resin based UV/visible light-resistant composite material assembly, suitable for use in aircraft assemblies, aircraft sub-assemblies, and aircraft, as disclosed herein.

As shown in FIG. 3, in a present selected co-curing regimen shown as process "A", a co-curable composite material "stack" 50 is prepared (e.g. laid up) and presented to a co-curing regimen having temperatures, temperature ramping, temperature dwell periods (e.g., dwell times, etc.) imposed within temperature and time ranges and/or specific temperature and time values, some of which are explicitly set forth herein. As shown in FIG. 3, co-curable composite material "stack" 50 comprises co-curable epoxy resin-containing composite material substrate 40 illustrated as a plurality of co-curable epoxy resin-containing composite material substrate prepreg layers. Present aspects further contemplate a co-curable epoxy resin-containing composite material substrate that can comprise any number of layers including a single co-curable epoxy resin-containing composite material substrate layer. Co-curable composite material "stack" 50 further comprises a co-curable unsupported epoxy resin-based UV/visible light-resistant material layer 30. As further shown in FIG. 3, co-curable composite material "stack" 50 further comprises a dry veil material layer 20 interposed between co-curable epoxy resin-containing composite material substrate 40 and co-curable unsupported epoxy resin-based UV/visible light-resistant material layer 30. According to a selected curing regimen, co-curable composite material "stack" 50 is introduced into autoclave 51 as indicated by arrow $A_1$.

As shown in FIG. 3, co-curable unsupported epoxy resin-based UV/visible light-resistant material layer 30 comprises a first cure characteristic that can be in the form of a first gel point temperature value, with the first cure characteristic facilitating and otherwise controlling a material flow of epoxy resin material from co-curable unsupported epoxy resin-based UV/visible light-resistant material layer 30 when the first gel point temperature value is achieved in a co-curing regimen. Co-curable epoxy resin-containing composite material substrate 40 comprises an induced second cure characteristic that can be in the form of a second gel point temperature value, with the induced second cure characteristic (e.g., second gel point temperature value) of the co-curable epoxy resin-containing composite material substrate 40 having a value that is intentionally different from the first cure characteristic (first gel point temperature value) of the co-curable unsupported epoxy resin-based UV/visible light-resistant material layer 30, and thus establishing a cure characteristic differential in the form of a gel point temperature value differential resulting in a differential curing viscosity between the epoxy resin in the co-curable unsupported epoxy resin-based UV/visible light-resistant material layer 30 and the epoxy resin in the co-curable epoxy resin-containing composite material substrate 40 in the co-curable composite material "stack" 50.

As curing conditions are imposed on co-curable composite material "stack" 50, and as a curing temperature approaches a first gel point temperature value of the unsupported epoxy resin-based UV/visible light-resistant material layer 30, epoxy resin only from the unsupported epoxy resin-based UV/visible light-resistant material layer 30 will "wet out" and will otherwise change from a solid or semi-solid state and "gel" into a liquid state that will penetrate, infiltrate, impregnate, and otherwise "enter into" the dry veil material layer and into dry veil material layer interstices that occur adjacent to and/or among individual fiber strands (e.g., fibers) present in the dry veil material layer, with the dry veil material fibers coated exclusively and coated substantially completely by epoxy resin originating only from the unsupported epoxy resin-based UV/visible light-resistant material layer 30. During this dry veil material layer impregnation, the temperature presented in the selected curing regimen will only proceed to a temperature that approaches, and/or equals and that does not exceed the first gel point temperature value (e.g., the first cure characteristic) of the unsupported epoxy resin-based UV/visible light-resistant material layer 30. The curing temperature at this point in the co-curing process does not approach the second gel point temperature (the induced second cure characteristic) of the co-curable epoxy resin-containing composite material substrate 40, and no epoxy resin is liberated from the co-curable epoxy resin-containing composite material substrate 40.

As shown in FIG. 3, during the selected co-curing regimen undertaken within autoclave 51, as the first gel point is approached and attained, and as only epoxy resin from the co-curable unsupported epoxy resin-based UV/visible light-resistant material layer 30 infiltrates the dry veil material layer 20, the initial co-curable composite material "stack" 50 transforms into co-curable composite material "stack" 60 (referred to equivalently herein as a "co-curing" composite material stack) that represents a co-curable composite material "stack" where the dry veil material layer is no longer "dry" and instead has begun to absorb and/or otherwise accept an epoxy resin flow into the previously unoccupied and "dry" dry veil material layer to form a dry veil epoxy resin impregnated region 71 within epoxy resin-infiltrated dry veil material layer 70. At this stage, as perhaps better shown in the enlarged region 62 of co-curable composite material "stack" 60 (shown within the "circular dotted line") black arrows indicate a directional flow into the previously "dry", dry veil material layer of epoxy resin (e.g., an infiltrating epoxy resin flow) originating from (e.gt., derived from) within the unsupported epoxy resin-based UV/visible light-resistant material layer 30 as dry veil epoxy resin impregnated region 71 is formed; and as a dry veil region yet to be impregnated 72 diminishes in volume as the epoxy resin impregnation of the dry veil material continues to completion.

The infiltrating epoxy resin flow from the co-curing unsupported epoxy resin-based UV/visible light-resistant material layer 30 saturates and otherwise completely occupies the interstitial spaces and volume within the dry veil material layer 20 to substantially completely coat the dry veil material layer fibers with the infiltrating epoxy resin flow and, in the infiltrating process, the two formerly discrete layers 20, 30 in the initial co-curable composite material "stack" 50 (e.g., the co-curable unsupported epoxy resin-based UV/visible light-resistant material layer 30; and the dry veil material layer 20) combine to form one epoxy resin-infiltrated dry veil material layer shown in FIG. 3 as the epoxy resin-based UV/visible light-resistant material layer 70 in the co-curing composite material "stack" 60.

In one present example, if desired, an amount of epoxy resin (e.g., an excess amount of epoxy resin) from the unsupported epoxy resin-based UV/visible light-resistant material layer 30 can " " rest" and cure on the surface of a fully saturated infiltrated dry veil material layer 70. A material interface is shown in FIG. 3 as composite material substrate (40)/epoxy resin-infiltrated dry veil material layer (70) interface 66 in the co-curing composite material "stack" 60. According to present aspects, a curing regimen is selected (in combination with the selected dry veil material layer and the cure characteristic differential) such that substantially no commingling occurs between the epoxy material from the unsupported epoxy resin-based UV/visible light-resistant material layer 30 and epoxy resin from the co-curable epoxy-resin containing material substrate 40, even at composite material substrate (40)/epoxy resin-infiltrated dry veil material layer (70) interface 66 (referred to equivalently herein as "interface 66").

As further shown in FIG. 3, after the formation of the epoxy resin-infiltrated dry veil material layer 70, and as the curing regimen proceeds, elevating co-curing temperatures can approach and attain the second gel point temperature value (e.g., the induced second cure characteristic), where the epoxy resin within the co-curable epoxy resin-containing composite material substrate 40 will cure in the co-curing regimen, resulting in a co-cured composite material 80 that comprises a co-cured epoxy resin-containing composite material substrate 82 that is perhaps better shown in the enlarged region 84 of co-curable composite material "stack" 80 (shown within the "circular dotted line"). In the co-cured composite material 80 (removed from autoclave 51 as indicated by arrow $A_2$), a co-cured epoxy resin-containing composite material substrate (82)/epoxy resin-infiltrated dry veil material layer (70) interface 86 is shown (referred to equivalently herein as interface 86). According to present aspects, a curing regimen is selected in combination with the selected dry veil material layer and the cure characteristic differential such that substantially no commingling occurs at interface 86 between the epoxy material from the epoxy resin-infiltrated dry veil material layer 70 and epoxy resin from the co-curable epoxy-resin containing material substrate 82 at interface 86.

According to a present aspect, the present co-curing methods and co-curable and co-cured composite materials afford significantly greater UV/visible light resistance protection to a composite material substrate, and 100% of the UV/visible light-resistance properties of the co-cured composite material 80 can be imparted to the co-cured composite material 80 solely and exclusively by the co-curable unsupported epoxy resin-based UV/visible light-resistant material layer 30 that is configured to infiltrate the dry veil material layer. In the co-cured state, according to present aspects, the epoxy resin-infiltrated dry veil material layer 70 of the co-cured composite material 80 is referred to equivalently herein as the co-cured UV/visible light-resistant material layer 70.

According to present aspects, by significantly inhibiting and substantially eliminating intermingling and/or eliminating commingling of epoxy resin from two epoxy resin sources, UV-resistance characteristics (referred to equivalently herein as UV/visible light-resistant properties) provided to the composite material originated from (e.g., are derived from) only the unsupported epoxy resin-based UV/visible light-resistant material layer 30. UV/visible light-resistant properties) provided to the composite material originated from (e.g., are derived from) only the unsupported epoxy resin-based UV/visible light-resistant material layer 30 are: 1) significantly sequestered from interference by composite material substrate epoxy resin; 2) undiluted by the composite material substrate epoxy resin, and are otherwise 3) preserved at peak UV/visible light-resistance performance values near or at the co-cured composite material surface, with the epoxy resin-based UV/visible light-resistant material retained substantially completely within the infiltrated dry veil material layer 70 of the co-cured composite material 80 in the co-cured state.

FIG. 4 is another illustrated representation of the curing regimen shown in FIG. 3, (with similar features similarly numbered as in FIG. 3) with FIG. 4 showing a representative cross-sectional side view of the present co-cured UV/visible light-resistant composite material formed through the shown curing regimen "A", with the co-curable composite material "stack" 50 co-curing within autoclave 51 in a curing regimen similar to that described herein with respect to FIG. 3.

FIGS. 5, 6, 7, 8, 9, and 10 are flowcharts outlining methods according present aspects. FIG. 5 outlines a present method 100 for preparing a co-curable UV/visible light-resistant composite material stack for an aircraft structure, with the method comprising forming 102 a co-curable UV/visible light-resistant composite material stack. The co-curable UV/visible light-resistant composite material stack comprises a co-curable epoxy resin-based UV/visible light-resistant material layer comprising a co-curable epoxy-resin based UV/visible light-resistant material layer film, with the co-curable resin-based UV/visible light-resistant material layer film consisting of an unsupported resin-containing film, and with the unsupported resin-containing film comprising a co-curable epoxy resin comprising a first cure characteristic. The co-curable UV/visible light-resistant composite material stack further comprises a co-curable epoxy resin-containing material substrate, with the co-curable epoxy resin-containing material substrate comprising a co-curable epoxy resin comprising an induced second cure characteristic. The co-curable UV/visible light-resistant composite material stack further comprises a dry veil material interposed between the unsupported resin-containing film the co-curable epoxy resin-containing composite material substrate and the unsupported resin-containing film, with the dry veil material layer comprising dry veil material layer fibers, and with the dry veil material layer fibers comprising at least one of metal fibers, glass fibers, carbon fibers, polymer fibers, natural fibers, coated metal fibers, coated glass fibers, coated carbon fibers, coated polymer fibers, coated natural fibers, metal-coated fibers, metal-coated glass fibers, metal-coated carbon fibers, metal-coated polymer fibers, metal-coated natural fibers, and combinations thereof.

The method 100 further comprises establishing intentionally 104 a cure characteristic differential (referred to equivalently herein as a differential cure characteristic) between the first cure characteristic and the induced second cure characteristic, with the first cure characteristic comprising at least one of a first gel point temperature value, a first gel time, and a first curing viscosity value, and with the induced second cure characteristic comprising at least one of a second gel point temperature value, a second gel time, and a second curing viscosity value, and wherein the first gel point temperature value is less than the second gel point temperature value.

In another present aspect, method 100 further comprises establishing intentionally 104 a differential cure viscosity between the first cure characteristic and the induced second cure characteristic during curing, and wherein the induced second cure characteristic is a second gel point temperature value and the first cure characteristic is a first gel point temperature value that is less than the second gel point temperature value.

FIG. 6 is a flowchart outlining another present aspect directed to a method 200 for preparing a co-cured UV/visible light-resistant composite material for an aircraft structure, with the method 200 comprising the steps set forth in method 100 shown in FIG. 5, and with method 200 further comprising co-curing 202 the co-curable composite material stack in a selected curing regimen to form the co-cured UV/visible light-resistant composite material for the aircraft structure, with the co-cured UV/visible light-resistant composite material comprising a co-cured unsupported epoxy resin-based UV/visible light-resistant material layer and a co-cured epoxy resin-containing material substrate, and impregnating exclusively during co-curing 204 the dry veil material layer with an amount of epoxy resin from the co-curable unsupported epoxy resin-based UV/visible light-resistant material layer film into the dry veil material layer to form a co-cured epoxy resin-impregnated dry veil material layer in a co-cured state, and wherein epoxy resin from the co-curable epoxy resin-containing material substrate does not commingle in the dry veil material layer with epoxy resin from the co-curable unsupported epoxy resin-based UV/visible light-resistant material layer film.

FIG. 7 is a flowchart outlining another present aspect directed to a method 300 for preparing a co-cured UV/visible light-resistant composite material for an aircraft structure, with the method 300 comprising the steps of method 200 shown in FIG. 6, and with the method 300 further comprising establishing 302 a gel point differential between the first gel point temperature value of the co-curable unsupported epoxy resin-based UV/visible light-resistant material layer film and the second gel point temperature value of the co-curable epoxy resin-containing material substrate, with the second gel point temperature value configured to be greater that the first gel point value.

FIG. 8 is a flowchart outlining another present aspect directed to a method 400 for preparing a co-cured UV/visible light-resistant composite material for an aircraft structure, with the method 400 comprising the steps of methods 200, and 300 shown in FIGS. 6 and 7, respectively, and with the method 400 further comprising fully encapsulating 402 the dry veil material layer fibers with epoxy resin only from the co-curable unsupported epoxy resin-based UV/visible light-resistant material layer film to form a dry veil material fiber fully-encapsulated dry veil material layer. As shown in FIG. 8, method 400 further comprises completely excluding 404 the presence of epoxy resin derived from (e.g., originating from) the co-curable epoxy resin-containing material substrate from the dry veil material fiber fully-encapsulated dry veil material layer during the selected curing regimen.

FIG. 9 is a flowchart outlining another present aspect directed to a method 500 for preparing a co-cured UV/visible light-resistant composite material for an aircraft structure, with the method 500 comprising the steps of methods 200, 300, and 400 as shown in FIGS. 6, 7, and 8, respectively, and with the method 500 further comprising forming 502 an epoxy resin-based UV/visible light-resistant material layer film epoxy resin/co-curable epoxy resin-containing material substrate epoxy resin interface at a location that is substantially coincident in location with a co-cured epoxy resin-impregnated dry veil material layer/co-cured epoxy resin-containing material substrate interface.

FIG. 10 is a flowchart outlining another present aspect directed to a method 600 for preparing a co-cured UV/visible light-resistant composite material for an aircraft structure, with the method 600 comprising the steps of methods 200, 300, 400, and 500 as shown in FIGS. 6, 7, 8, and 9, respectively, and with the method 600 further comprising inhibiting completely 602 a migration of epoxy resin from the co-curable epoxy resin-containing material substrate during curing into the co-cured epoxy resin-impregnated dry veil material layer.

The present methods 100, 200, 300, 400, 500, and 600 outlined in FIGS. 5, 6, 7, 8, 9, and 10, respectively, can implement the co-curable composite material stacks and the co-cured composite materials made from the co-curable composite material stacks described herein and shown at least in FIGS. 1, 2A, 2B, 2C, 3, and 4.

According to present aspects, a selected degree of UV/visible light-resistance and UV/visible light-protection can be exclusively imparted to the co-cured composite material substrate by immediately contacting the co-curable composite material substrate with the epoxy resin-based UV/visible light-resistant material in the form of the epoxy resin-infiltrated dry veil material layer 70 that, for example, after co-curing, forms the co-cured UV/visible light-resistant composite material layer. That is, according to present aspects, previously required UV/visible light-resistant primers, UV-blocking paints, surfacing films, adhesive layers, etc., can be eliminated and their presence otherwise obviated as the present UV-protective function within the present co-cured UV/visible light-resistant composite material is exclusively satisfied by and provided to the co-cured composite material by the resulting presence of the epoxy resin-based UV/visible light-resistant material in the form of the epoxy resin-infiltrated dry veil material layer 70 being in immediate contact with the co-curable composite material substrate 40.

In addition to other advantages stated herein, according to present aspects, the present co-cured UV/visible light resistant composite materials display significantly improved composite material substrate protection from deleterious effects during storage, etc. While in storage, for example, the co-cured UV/visible light resistant composite materials can be referred to as co-cured UV/visible light-resistant composite assembly precursors awaiting integration into subassemblies, assemblies, etc. Present co-cured UV/visible light-resistant composite assembly precursors can be joined and integrated into larger composite material assemblies, including, for example, aircraft assemblies and aircraft subassemblies including, for example, an aircraft fuselage assembly, an aircraft horizontal stabilizer assembly, an aircraft vertical stabilizer assembly, and an aircraft wing assembly that, for example, can include a stringer that can be a composite material stringer, a spar that can be a composite material spar, etc., co-joined to a composite material skin, etc.

According to present aspects, composite material substrate surface layers such as, for example, coatings, primers, topcoats, applied layers, applied film layers, etc., can be applied to the present co-curable UV/visible light-resistant composite material stacks comprising the co-curable unsupported epoxy resin-based UV/visible light-resistant material layer film that exclusively infiltrates, impregnates and otherwise is directed to reside withing the dry veil material during curing. In addition, primers or other coating layers can be added to a composite material to improve adhesion of subsequent coating layers such as, for example, paints, topcoats, etc., to a composite material surface that may already have one or more other co-curable layers applied to a co-curable composite material substrate.

The characteristics of the present co-curable and co-cured UV/visible light-resistant composite materials can obviate the presence of coating material layers onto composite material surfaces, and significantly reduce labor intensive and time-consuming processes. The elimination of certain additional layers made unnecessary by the present aspects can further significantly reduce weight for large objects and large structures that include such present composite materials.

In addition, paint removal processes that remove various paint coating layers from composite materials can often damage protective surfacing layers that can be applied to composite materials and that are applied beneath paint coating layers and that can require significant resurfacing once the paint layers are stripped from the surfacing layers. For example, one or more of the composite material coating layers can each require separate surfacing preparation steps and procedures prior to the subsequent deposition of one or more coating layers onto composite material surfaces. In some instances, a portion of one or more previously deposited coating(s) must be removed, or otherwise reworked, before adding further coating layers. Such intermediate reworking of composite material surfaces during the treatment of composite material surfaces is also labor-intensive, time-consuming, and costly.

Previously, during the fabrication of composite material parts that can include for example, an epoxy resin-based composite materials that can comprise, for example, a carbon fiber reinforced polymer material, etc., composite material surfaces could incur degradation, even during production, due to exposure to ambient ultraviolet/visible light (UV/visible light) radiation.

In addition, composite materials are typically post-processed or "reworked", for example, to re-paint and/or resurface composite materials. For example, primers and paint coatings that include a UV mitigation, or a UV "blocking" agent can be applied to a composite material surface for the purpose of protecting a composite material surface from degradation and/or discoloration that can be caused, for example, by exposing the composite material to ultraviolet/visible light (UV/visible light) radiation during the use of the composite material as a construction material in the manufacture of, for example, a larger structure.

Applying UV mitigation, or "blocking", agents in layers to composite surfaces often adds manufacturing complexity in the form of, at least, increasing manufacturing time, increasing rework time, increasing overall production cost, etc., as such applied UV blocking material coverings typically are removed from the composite material or reactivated chemically or mechanically before additional composite material assembly processing is conducted. In addition, primer and surfacing film layers are often treated to accommodate a subsequent paint layer or topcoat. This treatment of individual subsequent layers added to a composite material system (that can be layers arranged into a "stack" on the composite material substrate (also referred to equivalently herein as a "stacked system", an "assembly system", or a "system".) again leads to increased manufacturing time, increased rework time, increased overall production cost, etc.

In addition, UV/visible light damage from UV/visible light wavelengths impacting coating layers used to coat composite materials, and/or impacting underlying composite materials during aircraft manufacture and aircraft use, can cause a composite material to require material rework. Exposure to UV/visible light radiation can alter a material's characteristic over time (e.g., during the serviceable life of a component, etc.). For example, UV/visible light radiation can render a coating layer or composite material vulnerable to processing damage, such as, for example, when a layer or composite material is exposed to, for example, a mechanical paint removal technique. Material layer selection for large structures to guard against environmental damage, including UV/visible light damage, can result in a required application of a series of coating layers, with each such coating layer application resulting in a significant amount of time, expense, and resulting added weight to large structures including, for example, aircraft (where weight considerations can further impact fuel usage, cargo and passenger capacity, aircraft range, etc.).

Further, some coatings (e.g. paints and primers, etc.) are often electrically insulative (e.g., comprising a dielectric material) and can impede the dissipation of static and other electrical charges. However, certain structures must dissipate electrical charges that build up on a structure's interior and/or exterior surfaces, including static electrical charges, and charges resulting from, for example lightning strikes, etc. The need for electrical charge dissipation is increasingly important in the aircraft industry, as aircraft manufacture continues to incorporate non-metallic materials. Further, in certain aircraft assemblies, non-metallic materials, such as composites, plastics, etc., that do not readily dissipate electrical charges predictably across their surfaces may be joined with, or otherwise contact, assemblies and sub-assemblies that comprise metallic materials that do conduct, and otherwise predictably direct, electrical charges. That is, according to present aspect, components, assemblies and sub-assemblies that include both composite and metallic materials may be used in the manufacture of, or otherwise incorporated into, larger structures (e.g. aircraft).

Present aspects recognize that such structures may encounter electromagnetic effects (EMEs) including, for example, and without limitation, lightning strikes. When a structure encounters an EME, the electrical charge delivered to the structure travels throughout any conductive path. Accordingly, if a structure comprising insulative (e.g., dielectric) materials does not present a conductive pathway for encountered EMEs, the current from the EMEs can significantly damage the insulative materials that can be, for example, composite materials.

Presently disclosed aspects are directed to co-curable and co-cured composite material assemblies comprising a co-curable and co-cured UV/visible light-resistant lightning strike protection layer that can be co-cured with the co-curable composite material substrate to form a co-cured UV/visible light-resistant lightning strike protection composite material assembly. The incorporation into the co-cured composite material substrate of the co-cured UV/visible light-resistant lightning strike protection layer significantly impacts composite material manufacturing processes, improves the performance of the co-cured composite material assembly (and larger structures comprising the co-cured composite material assembly), and reduces the weight of the composite material assembly by, at least, obviating the need to include separate UV-resistant coatings formerly applied to composite material substrates (in the formation of composite material assemblies, such as, e.g., for the protection of composite materials from UV/visible light damage both during composite material manufacture and during use of the composite material assembly, and in the preparation of a composite material system used in structural assemblies for larger components, including internal and exterior surfaces of vehicles, including, for example, aircraft. The terms co-cured UV/visible light-resistant composite material "system" and co-cured UV/visible light-resistant composite material "assembly" are used equivalently herein.

According to present aspects, methods for improving the UV/visible light protection and reducing UV/visible light degradation of composite material substrate surface are disclosed, as well as composite materials having improved UV/visible light protection in combination with EME protection (referred to equivalently herein as lightning strike protection) without the previously required presence of typically applied protective coverings or layers of primers or separate layers of, for example, UV-absorbing paint.

In addition to preventing UV/visible light degradation of underlying composite material substrate surfaces, presently disclosed methods and presently disclosed composite materials eliminate the need for protective coverings, protective primer layers, UV-absorbing paint layers, with the result being a reduction in a composite material system complexity and overall composite material system weight that further reduces composite material processing time. The reduction in composite material UV/visible light degradation further decreases the occurrence of the need for composite material rework (such as scheduled and unscheduled rework previously necessitated by such UV/visible light degradation).

According to further presently disclosed aspects, a co-curable composite material for use in the manufacture of a composite material structure further includes a co-curable and co-cured UV/visible light-resistant lightning strike protection layer (equivalently referred to herein as a co-curable UV/visible light-inhibiting lightning strike protection layer), with the co-curable UV/visible light-resistant lightning strike protection layer in the form of a co-cured composite material that can include a conductive material alone and/or in combination with a non-conductive material. The conductive material can be a metallic material that can be in the form of, and otherwise include, for example, expanded, knitted, solid, and/or woven metallic material of the type that can be used in lightning strike protection layers incorporated into large structures including, for example, aircraft.

According to present aspects, the conductive material can be combined with a co-curable UV/visible light-resistant material to form the co-curable UV/visible light-resistant lightning strike protection material layer that can be applied in a layer, and that can be applied as an individual layer (e.g., a single ply and/or a single layer), or that can be applied in a plurality of plies. Further, the co-curable UV/visible light-resistant lightning strike protection material layer can be applied as a film. The co-curable UV/visible light-resistant lightning strike protection material layer can comprise a fiber-containing material or other material in a resin matrix such as, for example, fiberglass, carbon fibers, polyester fibers, aramid fibers, and combinations thereof. In a further aspect, the co-curable UV/visible light-resistant lightning strike protection material layer can comprise a quartz-containing material in a resin matrix.

In one present example, the co-curable UV/visible light-resistant lightning strike protection material layer is disposed within the composite material assembly such that the co-curable UV/visible light-resistant lightning strike protection material layer is in intimate contact with the co-curable composite material substrate. The lightning strike protection material layer can incorporate UV/visible light resistant agents and can be, according to present aspects, a co-curable UV/visible light-resistant lightning strike protection material layer. In this example, the co-curable UV/visible light-resistant lightning strike protection material layer in combination with the unsupported epoxy resin-based UV/visible light-resistant film layer will together provide 100% of the UV/visible light-resistance to the entire co-curable and co-cured composite material stack.

In another present example, depending upon the desired end use of the presently disclosed composite materials (e.g., an aircraft wing assembly), the lightning strike protection layer can be placed in intimate contact with the composite material substrate and interposed between the composite material substrate and the dry veil material layer impregnated with the epoxy resin from the unsupported epoxy resin-based UV/visible light-resistant film layer. Further, the lightning-strike protection layer that may or may not also be a UV-visible-light resistant layer also can be applied as a film that can be a single layer film.

In another present example, the lightning strike protection layer can rest and otherwise be positioned adjacent to the dry veil material layer impregnated with the epoxy resin from the co-cured unsupported epoxy resin-based UV/visible light-resistant film layer, and with the dry veil material layer (that is impregnated with the epoxy resin from the co-cured unsupported epoxy resin-based UV/visible light-resistant film layer) interposed between a lightning strike protection layer and the composite material substrate.

In a further present example, the dry veil material comprises metal fibers and/or fibers that are coated with a metallic coating. Stated another way, according to present examples, as stated herein, the dry veil material can comprise metal fibers and/or metal-coated fibers to form a "metallic" dry veil material layer. In this example, when a metallic dry veil material layer is impregnated with the epoxy resin from the unsupported epoxy resin-based UV/visible light-resistant film layer during co-curing, in a co-cured state the metallic dry veil material layer can serve the dual purpose of providing to the co-cured composite material both: 1) up to 100% of the UV/visible light resistance provided to the co-cured composite material; and 2) lightning strike (EME) composite material substrate protection.

In this example, a separate, additional lightning strike protection layer can be obviated, and the dual functioning "metallic" dry veil material layer impregnated with the epoxy resin from the unsupported epoxy resin-based UV/visible light-resistant film layer is positioned immediately adjacent to, and can completely cover, the adjacently positioned side of the composite material substrate (that can be the composite material first side).

The lightning strike protection layer and the dry veil material layer can each comprise a fiber-containing material or other material in a resin matrix such as, for example, fiberglass, carbon fibers, polyester fibers, aramid fibers, and combinations thereof. In a further aspect, the lightning strike protection layer can comprise a quartz-containing material in a resin matrix.

As stated herein, the co-curable composite material substrate, also referred to equivalently herein as the "co-curable substrate base layer", or the "co-curable underlayer", or the "co-curable composite material substrate layer", can be a co-curable composite material that can be an epoxy resin-based material, including fiber reinforced polymer composite materials that can have an epoxy resin-based matrix, and that can include carbon fibers, boron fibers, aramid fibers, fiberglass fibers, polyester fibers, and combinations thereof, with carbon fibers being particularly preferred, and with a carbon fiber reinforced polymer being particularly preferred as a co-curable composite material substrate.

In another present aspect, the unsupported epoxy resin-based UV/visible light-resistant material layer film further comprises a UV/visible light resistivity value of about 12,000 $kJ/m^2$ for full spectrum UV light at a UV wavelength ranging from about 300 nm to about 400 nm, and about 43,000 $KJ/m^2$ at a visible light wavelength ranging from about 400 to about 700 nm at an unsupported epoxy resin-based UV/visible light-resistant material layer film thickness ranging from about 0.0001 to about 0.010 inches.

According to present aspects, a selected degree up to 100% of UV/visible light-resistance and UV/visible light-protection can be exclusively imparted to the composite material substrate by an adjacently positioned impregnated dry veil material layer. In another present aspect, it is the combination of the impregnated dry veil material layer and a UV/visible light resistant lightning strike protection layer that, together (e.g., in combination) impart a selected degree of up to 100% of the UV/visible light-resistance and UV/visible light-protection afforded to the composite material substrate.

That is, according to present aspects, previously required UV/visible light-resistant primers, UV-blocking paints, etc., can be eliminated, and/or their presence is otherwise completely obviated and/or significantly reduced in amount applied, as the UV/visible light protection function within a UV/visible light-resistant composite material can be exclusively satisfied (e.g., 100% satisfied) by the addition and placement of the presently disclosed dry veil material layer impregnated with the epoxy resin from the co-curable unsupported epoxy-resin-based UV/visible light-resistant material layer film during curing with and without the presence of a UV-resistant light strike protection layer (referred to equivalently herein as the "co-curable LSP layer"), By co-curing the co-curable UV/visible light-resistant lightning strike protection layer with the co-curable composite material substrate, advantages are imparted by the presently disclosed co-cured UV/visible light-resistant lightning strike protection layer at least to the underlying epoxy-based co-cured composite material substrate and to the entire co-cured composite material assembly as well as to any material and/or structure that incorporates the co-cured composite material substrate and co-cured composite material assembly. According to present aspects, such imparted advantages include, without limitation, the UV/visible light protection of the epoxy-based composite material, as well as, for example, protection of a composite material substrate from deleterious effects of mechanical paint removal techniques, etc.

In addition, the robustness of the presently disclosed co-curable UV/visible light-resistant lightning strike protection layer that is co-cured onto and/or co-cured with, for example, a co-curable epoxy-based composite material substrate can endure subsequent and repeated heat treatments that may be required during subsequent and repeated repainting protocols. That is, unlike some currently required repainting protocols, the presently described co-cured UV/visible light-resistant lightning strike protection layer need not be replaced, removed, or otherwise reapplied during reworking, paint removal, repainting, repeated heat treatments, etc. Present aspects contemplate, if required, only the removal, reconditioning, reworking, etc., of only the layers coated atop the presently disclosed co-cured composite material assembly such as, for example, topcoat layers, basecoat layers, clearcoat layers, intermediate coating layers, etc.

Through the use of the presently disclosed co-cured composite material assembly incorporating the co-cured impregnated dry veil material layer and the co-curable UV/visible light-resistant lightning strike protection layer that can together form a co-cured UV/visible light-resistant lightning strike protection layer, a significant number of procedural steps that are otherwise, and have previously been, required during re-painting or reworking a composite material substrate are obviated; resulting in a substantial reduction in resources including, for example, material cost for replacing UV/visible light-damaged layers, manpower hours previously required for individual layer application treatment (e.g., individual layer pre-treatment surfacing steps, layer application steps, layer post-treatment surfacing steps, including chemical application, physical surfacing treatments such as, including sanding, etc., inspection of deposited layers, etc.).

Useful end-uses of the presently disclosed and significantly improved co-curable and co-cured UV/visible light-resistant composite materials include aircraft horizontal stabilizer assemblies and horizontal stabilizer sub-assemblies. In addition, when lightning strike protection is of particular concern, in addition to the superior and improved UV/visible light-resistance capabilities, the present co-curable and co-cured composite materials that comprise the impregnated dry veil material layer can further incorporate metal fibers or metal-coated fibers to form a significantly improved UV/visible light-resistant and lightning strike-protective composite material layer useful in the formation of and incorporation into aircraft wing assemblies and aircraft wing sub-assemblies.

FIG. 11A is an enlarged representative cross-sectional side view of a co-curable composite material stack 50, according to present aspects. As shown in FIG. 11A, a present assembled co-curable composite material stack 50 is shown in a "pre-cured" or "uncured" state (referred to equivalently herein as a co-curable state), with the co-curable composite material stack 50 of the type shown in FIGS. 3 and 4 and described herein with the co-curable composite material stack 50 comprising co-curable epoxy resin-containing composite material substrate 40 a co-curable unsupported epoxy resin-based UV/visible light-resistant material layer 30. As further shown in FIG. 11A, co-curable composite material "stack" 50 further comprises a dry veil material layer 20 interposed between co-curable epoxy resin-containing composite material substrate 40 and co-curable unsupported epoxy resin-based UV/visible light-resistant material layer 30, with dry veil material layer comprising a dry veil material layer first side 20*a* and a dry veil material second side 20*b*, with dry veil material second side 20*b* positioned adjacent to and in immediate contact with co-curable epoxy resin-containing composite material substrate 40.

Although shown in FIG. 11A as a single material, co-curable epoxy resin-containing composite material substrate 40 can comprise a plurality of co-curable epoxy resin-containing composite material substrate prepreg layers. Present aspects further contemplate a co-curable epoxy resin-containing composite material substrate that can comprise any number of layers including a single co-curable epoxy resin-containing composite material substrate layer.

FIG. 11B is an enlarged representative cross-sectional side view of the co-curable composite material stack 60 similar to stack 50 shown in FIG. 11A (and in FIGS. 3 and 4) that is undergoing a curing regimen and is in a "co-curing state" such that co-curable unsupported epoxy resin-based UV/visible light-resistant material layer 30 is subjected to a (first) gel point temperature that (can be less than 150° C.) where epoxy resin in the co-curable unsupported epoxy resin-based UV/visible light-resistant material layer 30 is migrating into (e.g., infiltrating), and is otherwise impregnating the dry veil material layer 20 to form, in a co-curing and co-cured state, the co-cured epoxy resin-infiltrated UV/visible light-resistant dry veil material layer 70 with the previously unsupported epoxy resin-based UV/visible light-resistant material layer 30 now in a "supported" configuration within the dry veil material layer (and referred to equivalently herein as a "supported" epoxy resin-based UV/visible light-resistant material layer 70 and/or a "wetted" dry veil material layer 70) that comprises the co-cured supported epoxy resin-based UV/visible light-resistant material layer first side 70*a* and the co-cured supported epoxy resin-based UV/visible light-resistant material layer second side 70*b*.

FIG. 11C is an enlarged representative cross-sectional side view of the co-cured composite material stack 88 of the type as shown in FIG. 11A, 11B (and in FIGS. 3 and 4) continuing in a curing regimen to a co-cured state. As shown in FIG. 11C, as a temperature increases above the first gel point temperature value that is below 150° C. and exceeds 150° C. and reaches the second gel point temperature value that is above 150° C., the co-curable epoxy resin-containing composite material substrate 40 shown in FIGS. 11A and 11B (and FIGS. 3 and 4) cures to form co-cured composite material substrate 82. As shown in FIG. 11C, co-cured UV/visible light-resistant composite material 80 is formed and comprises co-cured supported epoxy resin-based UV/visible light-resistant material layer 70 and co-cured composite material substrate 82.

FIGS. 11A, 11B, and 11C further show layers of material that can, together, form a combination of finishing films, including a primer, a detail primer, a topcoat that can be configured to present cover composite materials to form a finished composite material on, for example, an aircraft structure of an aircraft that can be, for example, a horizontal stabilizer, a wing, etc. In present example, co-cured UV/visible light-resistant composite material 80 can accept, support, and be compatible with finishing layers 96 that can comprise primer layer 96*c*, primer layer 96*b*, and topcoat 96*a* to form co-cured UV/visible light-resistant composite material 88. The finishing layers are not intended to present an exhaustive lighting of finishing layers, paints, primers, topcoats, etc. that can coat the present co-cured and co-curable epoxy resin-based UV/visible light resistant composite materials and contribute to a composite material appearance and final characteristics (and that are collectively referred to equivalently herein as finishing layers and or surfacing layers).

According to present aspects, the number and type of finishing layers can be significantly reduced as the only UV/visible light resistance imparted on the finished composite material stack (including the finishing layers) from the co-curable unsupported epoxy resin-based UV/visible light-resistant material film layer 30 that then migrates into the dry veil material 30 when the first gel point temperature value is reached (in a selected curing regimen) to form the co-cured supported epoxy resin-based UV/visible light-resistant material layer 70. Stated another way, according to present aspects, and as shown at least in FIGS. 11A, 11B, 11C, 100% of the UV/visible light resistance of the co-curable composite material stacks 50, 60 and 100% of the UV/visible light resistance of the co-cured composite material stacks 80, 88 is derived from the co-curable unsupported epoxy resin-based UV/visible light-resistant material film layer 30. Stated in still another way, no other material layers in the co-curable stacks and co-cured composite materials shown in FIGS. 3, 4, 11A, 11B, and 11C comprise any UV/visible light-resistant material.

As described herein, the reduction in numbers of layers and layer types in a composite material used for a large structure (e.g., an aircraft, an aircraft assembly, an aircraft sub-assembly that can include a fuselage, a fuselage sub-assembly, a wing, a wing, sub-assembly, a horizontal stabilizer, a horizontal stabilizer sub-assembly, etc.) can significantly reduced overall weight of the composite material structure and, in turn, realize, at least, a significant reduction in production cost, operating cost, rework cost of the parts and the overall assembled aircraft and aircraft sub-assemblies, resulting in a significant reduction in fuel coat, a significant increase in range, etc.

FIGS. 12A, 12B, and 12C are an enlarged representative cross-sectional side views of a co-curable, co-curing, and co-cured composite material stacks, according to present aspects, and similar to composite material stacks shown in FIGS. 11A, 11B, and 11C, with substantially similar components numbered substantially similarly. FIGS. 12A, 12B, and 12C are provided to at least show that a further reduction in finishing layers 97 (in comparison to finishing layers 96 shown in FIGS. 11A, 11B, 11C can be achieved in the present finished composite materials, with finishing layers 97 comprising one less primer layer than the finishing layers 96 shown in FIGS. 11A, 11B, and 11C and forming co-cured UV/visible light-resistant composite material 88*a*.

As discussed herein, the presently disclosed co-curable and co-cured UV/visible light-resistant composite materials comprising and made from the present co-curable unsupported epoxy resin-based UV/visible light-resistant material film layer in combination with the dry veil material layer (and further in combination with establishing of the present curing characteristic differential between the unsupported epoxy resin-based UV/visible light-resistant material film layer and the co-curable epoxy resin-containing material substrate) can further incorporate lightning strike protection. In one example, according to present aspects, the present co-curable and co-cured UV/visible light-resistant composite materials can comprise an additional lightning strike protection layer. In addition, the present dry veil material layer itself can perform the function of a lightning protection layer and can be selectively modified to incorporate conductive fibers that can be metal fibers, metal-containing fibers, and/or metal-coated fibers with the dry veil material fibers comprising a selected fiber density to deliver a selected degree of lightning strike protection to the selected end use of the present co-cured UV/visible light-resistant composite material. The selected end use can be, for example, an aircraft structure that can be an aircraft assembly, an aircraft sub-assembly, and that can be an aircraft wing, an aircraft wing assembly, an aircraft wing sub-assembly, a horizontal stabilizer assembly, a horizontal stabilizer sub-assembly, etc.

Stated another way, the present impregnated dry veil material layer that is impregnated with the unsupported epoxy resin-based UV/visible light-resistant material layer during co-curing can further comprise a selected metal fiber density, metal-containing fiber density, and/or metal-coated fiber density to provide lightning strike protection. In such instances the co-cured composite material comprising the impregnated dry veil material layer in the co-cured state can perform the dual function of providing: 1) 100% of the UV/visible light protection afforded to the composite material substrate; and 2) a degree of from about 50% up to 100% of the lightning strike protection for the composite material substrate. In one example, the lightning strike protection layer that is the epoxy-resin infiltrated dry veil layer alone and/or the epoxy-resin infiltrated dry veil layer in combination with a separate lightning strike protection layer in the co-cured composite material comprises an electrical conductivity ranging from 0.01 milliOhms per square to 0.5 milliOhms per square.

When appropriately selected metal fiber, metal-containing fiber, metal-coated fiber is incorporated into the epoxy resin-infiltrated (e.g., epoxy resin impregnated) dry veil material layer that is incorporated into the present co-curable and co-cured composite materials of the type shown in FIGS. 11A, 11B, 11C, 12A, 12B, 12C (and FIGS. 3 and 4), the dual-function of UV/visible light resistance and lightning strike protection can be provided to the present composite material stacks, and to structures comprising the present composite materials in the single epoxy resin impregnated dry veil layer.

As stated herein, in further present aspects, a separate, additional lightning strike protection layer can be incorporated into the present co-curable and co-cured UV/visible light-resistant composite materials. According to present aspects, the separate lightning strike protection layer can comprise an electrical conductivity ranging from 0.01 milliOhms per square to 0.5 milliOhms per square.

FIGS. 13A, 13B, 13C and FIGS. 14A, 14B, and 14C are enlarged cross-sectional side views of present co-curable, co-curing, and co-cured composite material stacks of the type similar to (and numbered similarly to) those shown in the FIGS. 12A, 12B, and 12C, and additionally include a lightning strike protection layer 78. When the impregnated dry veil material layer performs the dual-function of UV/visible light resistance and lightning strike protection for the co-cured composite material, the epoxy resin-infiltrated dry veil material layer 70 can obviate the need for separate lightning strike material layer 78. Stated another way, in FIGS. 13A, 13B, 13C and FIGS. 14A, 14B, and 14C it is understood that, in the scenario where the epoxy resin-infiltrated dry veil material layer 70 performs the dual-function of UV/visible light resistance and lightning strike protection, layer 78 does not exist as a separate layer and/or 78 and 70 can effectively be one combined layer.

As also shown in FIGS. 13A, 13B, and 13C, when the lightning strike protection layer 78 is provided to and is otherwise present as a separate layer in the co-curable, co-curing, and co-cured composite material stacks (150, 160, 180, respectively), lightning strike protection layer 78 can be positioned immediately adjacent to the impregnated dry veil material layer first side 70*a* (with the epoxy resin-infiltrated dry veil material layer 70 also functioning in the composite material stack as the exclusive (e.g., 100%) UV/visible light-resistant layer provider to the co-curable and co-cured composite material stack).

As shown in FIGS. 14A, 14B, when the lightning strike protection layer 78 is provided to and is otherwise present as a separate layer in the co-curable and co-curing composite material stacks (250, 260, respectively) lightning strike protection layer 78 can be positioned immediately adjacent to co-curable composite material substrate 40. As further shown in FIGS. 14A and 14B, when the lightning strike protection layer 78 is provided to the co-curable/co-curing composite material stacks (250, 260, respectively) as a separate layer, the lightning strike protection layer 78 is interposed between co-curable composite material substrate 40 and the co-curable and co-curing impregnated dry veil material layer second side 70*b*. As shown in FIG. 14C, when the lightning strike protection layer 78 is present in the co-cured composite material stack 280 as a separate layer, the lightning strike protection layer 78 is interposed between co-cured composite material substrate 82 and the co-curable and co-cured impregnated dry veil material layer second side 70*b*.

FIGS. 13A, 13B, 13C, 14A, 14B, and 14C further show layers of material that can, together, form a combination of finishing films, including a primer, a detail primer, a topcoat that can be configured to cover present composite materials to form a finished composite material on, for example, an aircraft structure of an aircraft that can be, for example, a horizontal stabilizer, a wing, etc. In present example, co-cured UV/visible light-resistant composite material 180, 280 can incorporate, accept, support, and be compatible with finishing layers 97 that can comprise primer layer 96*b*, and topcoat 96*a*. The finishing layers are not intended to present an exhaustive lighting of finishing layers, paints, primers, topcoats, etc. that can coat the present co-cured epoxy resin-based UV/visible light resistant composite materials and contribute to a composite material appearance and final characteristics (and that are collectively referred to equivalently herein as finishing layers and or surfacing layers).

FIGS. 15, 16, 17, 18, and 19 are flowcharts outlining methods according present aspects. FIG. 15 outlines a present method 1500 for preparing a co-curable UV/visible light-resistant composite material stack for an aircraft structure, with the method 1500 comprising forming 1502 a co-curable UV/visible light-resistant composite material stack for the aircraft structure comprising a lightning strike protection layer, with the co-curable UV/visible light-resistant composite material stack comprising a co-curable unsupported epoxy resin-based UV/visible light-resistant material layer film comprising a first cure characteristic, with first cure characteristic value comprising at least one of a first gel point temperature value, a first gel time value, and a first curing viscosity value. The co-curable UV/visible light-resistant composite material stack further comprises a co-curable epoxy resin-containing composite material substrate, with the co-curable epoxy resin-containing material substrate comprising a co-curable epoxy resin comprising an induced second cure characteristic, with the induced second cure characteristic value comprising at least one of a second gel point temperature value, a second gel time value, and a second curing viscosity value. The co-curable UV/visible light-resistant composite material stack further comprises a dry veil material layer comprising a dry veil material layer first side and a dry veil material layer second side, with the dry veil material layer positioned immediately adjacent to the unsupported epoxy resin-based UV/visible light-resistant material layer film said dry veil material layer comprising dry veil material layer fibers, with the dry veil material comprising at least one of metal fibers, glass fibers, carbon fibers, polymer fibers, natural-product fibers, coated metal fibers, metal-coated glass fibers, metal-coated carbon fibers, metal-coated polymer fibers, metal-coated natural-product fibers, and combinations thereof. The co-curable UV/visible light-resistant composite material stack comprises a lightning strike protection layer positioned adjacent the co-curable unsupported epoxy resin-based UV/visible light-resistant material layer film. The method further comprises establishing intentionally 1504 a differential cure characteristic between the first cure characteristic and the induced second cure characteristic, and wherein said first gel point temperature value is less than the second gel point temperature value.

In another present aspect, FIG. 16 outlines a method 1600 for preparing a co-cured UV/visible light-resistant composite material for an aircraft structure comprising a lightning strike protection layer, with the method 1600 comprising the steps of method 1500 shown in FIG. 15, and with method 1600 further comprising co-curing 1602 the co-curable composite material stack in a selected curing regimen to form the co-cured UV/visible light-resistant composite material for the aircraft structure, with the co-cured UV/visible light-resistant composite material comprising a co-cured epoxy resin-based UV/visible light-resistant material layer and a co-cured epoxy resin-containing material substrate, impregnating exclusively during curing 1604 the dry veil material layer with an amount of epoxy resin from the co-curable unsupported epoxy resin-based UV/visible light-resistant material layer film into the dry veil material layer to form the co-cured epoxy resin-based UV/visible light-resistant material layer in the form of a co-cured epoxy resin-impregnated dry veil material layer in a co-cured state, and wherein epoxy resin from the co-curable epoxy resin-containing material substrate does not commingle in the dry veil material layer with epoxy resin from the co-curable unsupported epoxy resin-based UV/visible light-resistant material layer film.

In another present aspect, as shown in FIG. 17, method 1700 comprises the steps of method 1600 and further comprises establishing 1702 a gel point differential between the first gel point temperature value of the co-curable unsupported epoxy resin-based UV/visible light-resistant material layer film and the second gel point temperature value of the co-curable epoxy resin-containing material substrate, with the second gel point temperature value configured to be greater that the first gel point value.

In another present aspect, as shown in FIG. 18, method 1800 comprises the steps shown in method 1700, with method 1800 further comprising fully encapsulating 1802 the dry veil material layer fibers of the dry veil material layer with epoxy resin only from the co-curable unsupported epoxy resin-based UV/visible light-resistant material layer film during curing to form a fully fiber-encapsulated dry veil material layer, and completely excluding 1804 the presence of epoxy resin derived from the co-curable epoxy resin-containing material substrate from the fully fiber-encapsulated dry veil material layer during the selected curing regimen.

In another present aspect, as shown in FIG. 19, method 1900 comprises the steps shown in method 1800, with method 1900 further comprising forming 1902 an epoxy resin-based UV/visible light-resistant material layer film epoxy resin/co-curable epoxy resin-containing material substrate epoxy resin interface at a location that is substantially coincident with a co-cured epoxy resin-impregnated dry veil material layer/co-cured epoxy resin-containing material substrate interface, and inhibiting completely 1904 a migration of epoxy resin from the co-curable epoxy resin-containing material substrate during curing into the co-cured epoxy resin-impregnated dry veil material layer.

Another present aspect is directed to an aircraft structure comprising a co-cured UV/visible light-resistant composite material with lightning strike protection made according to a presently disclosed method.

Another present aspect is directed to an aircraft comprising an aircraft structure comprising a co-cured UV/visible light-resistant composite material comprising lightning strike protection made according to a presently disclosed method.

The present methods 1500, 1600, 1700, 1800, and 1900 outlined in FIGS. 15, 16, 17, 18, and 19, respectively, can implement and can be used to make the co-curable composite material stacks and the co-cured composite materials made from the co-curable and co-cured composite material stacks described herein and shown in FIGS. 1, 2A, 2B, 2C, 3, 4, 11A, 11B, 11C, 12A, 12B, 12C, 13A, 13B, 13C, 14A, 14B, and 14C.

According to present aspects, a selected degree of UV/visible light-resistance and UV/visible light-protection can be exclusively imparted to the co-cured composite material substrate by immediately contacting the co-curable composite material substrate with the epoxy resin-based UV/visible light-resistant material in the form of the epoxy resin-infiltrated dry veil material layer 70 that, for example, after co-curing, forms the co-cured UV/visible light-resistant composite material layer. That is, according to present aspects, previously required UV/visible light-resistant primers, UV-blocking paints, surfacing films, adhesive layers, etc., can be eliminated and their presence otherwise obviated as the present UV-protective function within the present co-cured UV/visible light-resistant composite material is exclusively satisfied by and provided to the co-cured composite material by the resulting presence of the epoxy resin-based UV/visible light-resistant material in the form of the epoxy resin-infiltrated dry veil material layer 70 being in immediate contact with the co-curable composite material substrate 40.

In addition to other advantages stated herein, according to present aspects, the present co-cured UV/visible light resistant composite materials display significantly improved composite material substrate protection from deleterious effects during storage, etc. While in storage, for example, the co-cured UV/visible light resistant composite materials can be referred to as co-cured UV/visible light-resistant composite assembly precursors awaiting integration into sub-assemblies, assemblies, etc. Present co-cured UV/visible light-resistant composite assembly precursors can be joined and integrated into larger composite material assemblies, including, for example, aircraft assemblies and aircraft sub-assemblies including, for example, an aircraft fuselage assembly, an aircraft horizontal stabilizer assembly, an aircraft vertical stabilizer assembly, and an aircraft wing assembly (all assemblies including respective sub-assemblies) that, for example, can include a stringer that can be a composite material stringer, a spar that can be a composite material spar, etc., co-joined to a composite material skin, etc.

Further present aspects contemplate use of the present co-curable composite materials and co-cured composite materials, assemblies comprising the co-cured composite materials, sub-assemblies comprising the co-cured composite materials, and structures comprising at least one of the assemblies and/or sub-assemblies comprising the co-cured UV/visible light-resistant composite materials that are made according to the methods set forth herein in the construction of larger structures including, for example, crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle, a crewed surface water borne vehicle, an uncrewed water-borne vehicle, a crewed sub-surface water borne vehicle, an uncrewed sub-surface water borne vehicle, a satellite, and combinations thereof.

According to present aspects, a "co-curable" material is defined as a material that can be co-cured with another material such that the two co-curable materials will co-cure when exposed to curing conditions in a common curing regimen, such as those that can be imposed by a selected curing regimen (selected temperature, pressure, ramp up temperatures/rates, dwell periods, etc.) to form a "co-cured" composition. The term "co-cured" as used herein means that different material layers within the composite material are cured in a single curing regimen that includes a selected range of temperatures and pressures. The term "co-curing" means that a curing regimen in commenced and co-curable materials subjected to the co-curing regimen are in a state of cure between partially and substantially completely cured. In the "co-cured" state, the co-curable and co-curing materials have completed the cure process, typically involving, in the case of polymer materials, a degree of cross-linking considered to be substantially complete.

The term "substantially" as used herein means that a particular characteristic, parameter, or value does not need to be exactly achieved. Rather, deviations or variations, including, for example, tolerances, measurement error, measurement accuracy limitations, dimensions, and other factors known to those skilled in the field, may occur in amounts that do not preclude the effect that the characteristic was intended to provide.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims and are intended to be embraced therein.

What is claimed is:

1. A co-curable UV/visible light-resistant composite material stack for an aircraft assembly comprising:

a co-curable unsupported epoxy resin-based UV/visible light-resistant material layer film comprising a first cure characteristic value, said first cure characteristic value comprising at least one of a first gel point temperature value, a first gel time value, and a first curing viscosity value;

a co-curable epoxy resin-containing composite material substrate, said co-curable epoxy resin-containing composite material substrate comprising a co-curable epoxy resin comprising an induced second cure characteristic value, said induced second cure characteristic value comprising at least one of a second gel point temperature value, a second gel time value, and a second curing viscosity value;

a dry veil material layer comprising a dry veil material layer first side and a dry veil material layer second side, said dry veil material layer first side positioned immediately adjacent to the unsupported epoxy resin-based UV/visible light-resistant material layer film, said dry veil material layer comprising dry veil material layer fibers, said dry veil material layer comprising at least one of metal fibers, glass fibers, carbon fibers, polymer fibers, natural-product fibers, coated metal fibers, metal-coated glass fibers, metal-coated carbon fibers, metal-coated polymer fibers, metal-coated natural-product fibers, and combinations thereof;

a lightning strike protection layer positioned adjacent at least one of the co-curable unsupported epoxy resin-based UV/visible light-resistant material layer film and the co-curable epoxy resin-containing composite material substrate; and wherein said first cure characteristic value and said induced second cure characteristic value are selected to establish a differential cure characteristic value between the first cure characteristic value and the induced second cure characteristic value.

2. The co-curable UV/visible light-resistant composite material stack of claim 1, wherein the dry veil material layer is interposed between the co-curable epoxy resin-containing composite material substrate and the co-curable unsupported epoxy resin-based UV/visible light-resistant material layer film.

3. The co-curable UV/visible light-resistant composite material stack of claim 1, wherein the lightning strike protection layer is positioned between the co-curable epoxy resin-containing composite material substrate and the dry veil material layer second side, said lightning strike protection layer in immediate contact with the co-curable epoxy resin-containing composite material substrate.

4. The co-curable UV/visible light-resistant composite material stack of claim 3, wherein the lightning strike protection layer comprises a UV/visible light-resistant material, said co-curable unsupported epoxy resin-based UV/visible light-resistant material layer film in combination with the UV/visible light-resistant layer lightning strike protection layer are together 100% responsible for UV/visible light-resistant properties in the co-curable UV/visible light-resistant composite material stack.

5. The co-curable UV/visible light-resistant composite material stack of claim 1, wherein the lightning strike protection layer is positioned adjacent the co-curable unsupported epoxy resin-based UV/visible light-resistant material layer film.

6. The co-curable UV/visible light-resistant composite material stack of claim 1, wherein said lightning strike protection layer is a separate layer.

7. The co-curable UV/visible light-resistant composite material stack of claim 1, wherein the dry veil material layer comprises at least one of metal fibers, metal-coated fibers, and combinations thereof, wherein said dry veil material layer disperses an electromagnetic effect from the co-curable UV/visible light-resistant composite material stack in a co-cured state.

8. The co-curable UV/visible light-resistant composite material stack of claim 1, wherein said co-curable unsupported epoxy resin-based UV/visible light-resistant material layer film comprising the first cure characteristic is 100% responsible for UV/visible light-resistant properties in the co-curable UV/visible light-resistant composite material stack.

9. The co-curable UV/visible light-resistant composite material stack of claim 1, wherein said first gel point temperature value is less than the second gel point temperature value.

10. The co-curable UV/visible light-resistant composite material stack of claim 1, wherein said co-curable epoxy resin-containing composite material substrate comprises a material substrate epoxy resin, said material substrate epoxy resin comprising the second gel point temperature value, said second gel point temperature value greater than 150° C., said material substrate epoxy resin further comprising the second curing viscosity value, said second curing viscosity value greater than about 1000 Pa-s at the second gel point temperature value, and wherein said first gel point temperature value of said co-curable unsupported epoxy resin-based UV/visible light-resistant material layer film is less than 150° C.

11. The co-curable UV/visible light-resistant composite material stack of claim 1, wherein said co-curable unsupported epoxy resin-based UV/visible light-resistant material layer film further comprises a UV/visible light resistivity value of 12,000 $KJ/m^2$ for full spectrum UV light at a UV wavelength ranging from 300 nm to 400 nm, and 43,000 $KJ/m^2$ at a visible light wavelength ranging from 400 nm to 700 nm at an unsupported epoxy resin-based UV/visible light-resistant material layer film thickness ranging from 0.0001 inches to 0.010 inches.

12. The co-curable UV/visible light-resistant composite material stack of claim 1, wherein the co-curable unsupported epoxy resin-based UV/visible light-resistant material layer film is a single layer film, wherein said single layer film completely covers at least one of the dry veil material layer first side and the dry veil material layer second side.

13. A co-cured UV/visible light-resistant composite material stack made from the co-curable UV/visible light-resistant composite material stack of claim 1 in a co-cured state wherein, during co-curing the dry veil material layer is infiltrated only with epoxy resin from the co-curable unsupported epoxy resin-based UV/visible light-resistant material layer film.

14. A co-cured UV/visible light-resistant composite material stack made from the co-curable UV/visible light-resistant composite material stack of claim 1, wherein, after co-curing, the dry veil material layer does not comprise a detectable amount of epoxy-based resin from the co-curable epoxy resin-containing composite material substrate in a co-cured state.

15. A co-cured UV/visible light-resistant composite material stack made from the co-curable UV/visible light-resistant composite material stack of claim 1, wherein, after co-curing no detectable amount of epoxy resin from the co-curable unsupported epoxy resin-based UV/visible light-resistant material layer film is detected in the co-curable epoxy resin-containing composite material substrate in a co-cured state.

16. An aircraft structure comprising the co-curable UV/visible light-resistant composite material stack of claim 1 in a co-cured state, said aircraft structure comprising at least one of a horizontal stabilizer assembly and a wing assembly.

17. An aircraft comprising the co-curable UV/visible light-resistant composite material stack of claim 1 in a co-cured state.

18. A method for preparing a co-curable UV/visible light-resistant composite material stack for an aircraft structure, the method comprising:

forming the co-curable UV/visible light-resistant composite material stack for the aircraft structure, the co-curable UV/visible light-resistant composite material stack comprising:

a co-curable unsupported epoxy resin-based UV/visible light-resistant material layer film comprising a first cure characteristic, said first cure characteristic value comprising at least one of a first gel point temperature value, a first gel time value, and a first curing viscosity value;

a co-curable epoxy resin-containing composite material substrate, said co-curable epoxy resin-containing composite material substrate comprising a co-curable epoxy resin comprising an induced second cure characteristic value, said induced second cure characteristic value comprising at least one of a second gel point temperature value, a second gel time value, and a second curing viscosity value;

a dry veil material layer comprising a dry veil material layer first side and a dry veil material layer second side, said dry veil material layer positioned immediately adjacent to the unsupported epoxy resin-based UV/visible light-resistant material layer film said dry veil material layer comprising dry veil material layer fibers, said dry veil material comprising at least one of metal fibers, glass fibers, carbon fibers, polymer fibers, natural-product fibers, coated metal fibers, metal-coated glass fibers, metal-coated carbon fibers, metal-coated polymer fibers, metal-coated natural-product fibers, and combinations thereof;

a lightning strike protection layer positioned adjacent the co-curable unsupported epoxy resin-based UV/visible light-resistant material layer film;

establishing intentionally a differential cure characteristic value between the first cure characteristic value and the induced second cure characteristic value, said first cure characteristic value comprising at least one of a first gel point temperature value, a first gel time value, and a first curing viscosity value, said induced second cure characteristic value comprising at least one of a second gel point temperature value, a second gel time value, and a second curing viscosity value;

wherein said first cure characteristic value and said induced second cure characteristic value are each selected to establish a selected differential cure characteristic value between the first cure characteristic value and the induced second cure characteristic value; and wherein said first gel point temperature value is less than the second gel point temperature value.

19. A method for preparing a co-cured UV/visible light-resistant composite material for an aircraft structure, the method comprising:

forming a co-curable composite material stack, the co-curable composite material stack comprising:

a co-curable unsupported epoxy resin-based UV/visible light-resistant material layer film comprising a first cure characteristic value, said first cure characteristic value comprising at least one of a first gel point temperature value, a first gel time value, and a first curing viscosity value;

a co-curable epoxy resin-containing composite material substrate, said co-curable epoxy resin-containing composite material substrate comprising a co-curable epoxy resin comprising an induced second cure characteristic value, said induced second cure characteristic value comprising at least one of a second gel point temperature value, a second gel time value, and a second curing viscosity value;

a dry veil material layer comprising a dry veil material layer first side and a dry veil material layer second side, said dry veil material layer positioned immediately adjacent to the co-curable unsupported epoxy resin-based UV/visible light-resistant material layer film, said dry veil material layer comprising dry veil material layer fibers, said dry veil material fibers comprising at least one of metal fibers, glass fibers, carbon fibers, polymer fibers, natural-product fibers, coated metal fibers, metal-coated glass fibers, metal-coated carbon fibers, metal-coated polymer fibers, metal-coated natural-product fibers, and combinations thereof;

a lightning strike protection layer positioned adjacent the co-curable unsupported epoxy resin-based UV/visible light-resistant material layer film;

establishing intentionally a differential cure characteristic value between the first cure characteristic value and the induced second cure characteristic value during co-curing;

co-curing the co-curable composite material stack in a selected curing regimen to form the co-cured UV/visible light-resistant composite material for the aircraft structure, said co-cured UV/visible light-resistant composite material comprising a co-cured unsupported epoxy resin-based UV/visible light-resistant material layer and a co-cured epoxy resin-containing composite material substrate;

impregnating exclusively during curing the dry veil material layer with an amount of epoxy resin from the co-curable unsupported epoxy resin-based UV/visible light-resistant material layer film into the dry veil material layer to form a co-cured epoxy resin-impregnated dry veil material layer in a co-cured state; and wherein epoxy resin from the co-curable epoxy resin-containing composite material substrate does not co-mingle in the dry veil material layer with epoxy resin from the co-curable unsupported epoxy resin-based UV/visible light-resistant material layer film.

20. The method of claim 19, further comprising:

establishing a gel point differential between the first gel point temperature value of the co-curable unsupported epoxy resin-based UV/visible light-resistant material layer film and the second gel point temperature value of the co-curable epoxy resin-containing composite material substrate, said second gel point temperature value configured to be greater that the first gel point value.

21. The method of claim 19, further comprising:

fully encapsulating the dry veil material layer fibers with epoxy resin from the co-curable unsupported epoxy resin-based UV/visible light-resistant material layer film during curing to form a fully encapsulated dry veil material layer; and completely excluding the presence of epoxy resin derived from the co-curable epoxy resin-containing composite material substrate from the fully encapsulated dry veil material layer during the selected curing regimen.

22. The method of claim 19, further comprising:

forming an epoxy resin-based UV/visible light-resistant material layer film epoxy resin/co-curable epoxy resin-containing composite material substrate epoxy resin interface at a location that is coincident with a co-cured epoxy resin-impregnated dry veil material layer/co-cured epoxy resin-containing composite material substrate interface; and inhibiting completely a migration of epoxy resin from the co-curable epoxy resin-containing composite material substrate during curing into the co-cured epoxy resin-impregnated dry veil material layer.

* * * * *